US007289906B2

(12) United States Patent
van der Merwe et al.

(10) Patent No.: US 7,289,906 B2
(45) Date of Patent: Oct. 30, 2007

(54) NAVIGATION SYSTEM APPLICATIONS OF SIGMA-POINT KALMAN FILTERS FOR NONLINEAR ESTIMATION AND SENSOR FUSION

(75) Inventors: Rudolph van der Merwe, Portland, OR (US); Eric A. Wan, Hillsboro, OR (US); Simon J. Julier, Falls Church, VA (US)

(73) Assignee: Oregon Health & Science University, Portland, OR (US)

( * ) Notice: Subject to any disclaimer, the term of this patent is extended or adjusted under 35 U.S.C. 154(b) by 168 days.

(21) Appl. No.: 11/099,433

(22) Filed: Apr. 4, 2005

(65) Prior Publication Data

US 2005/0251328 A1 Nov. 10, 2005

Related U.S. Application Data

(60) Provisional application No. 60/559,708, filed on Apr. 5, 2004.

(51) Int. Cl.
*G01C 21/00* (2006.01)
(52) U.S. Cl. .................... 701/214; 701/220; 701/200; 342/357.12
(58) Field of Classification Search .............. None
See application file for complete search history.

(56) References Cited

U.S. PATENT DOCUMENTS

| 5,627,768 A | 5/1997 | Uhlmann et al. ........... 364/553 |
| 5,963,888 A | 10/1999 | Uhlmann et al. ........... 702/109 |
| 6,331,835 B1* | 12/2001 | Gustafson et al. ....... 342/357.06 |
| 6,408,245 B1* | 6/2002 | An et al. .................... 701/216 |
| 6,721,657 B2* | 4/2004 | Ford et al. .................. 701/213 |

OTHER PUBLICATIONS

Bouvet et al.; Improving the accuracy of dynamic localization systems using RTK GPS by identifying GPS latency; Proceedings of the 2000 IEEE International Conf. on Robotics and Automation; Apr. 2000; pp. 2525-2530.*
Simon J. Julier, Jeffrey K. Uhlmann, and Hugh F. Durrant-Whyte, Robotics Research Group, Dept. of Engineering Science, University of Oxford, Oxford, UK, "A New Approach for Filtering Nonlinear Systems," 1995.
Eric A. Wan and Rudolph van der Merwe, Oregon Graduate Institute of Science & Technology, Beaverton, Oregon, USA, "The Unscented Kalman Filter for Nonlinear Estimation," Oct. 2000.
Rudolph van der Merwe and Eric Wan, OGI School of Science and Engineering, Oregon Health & Science University, "Gaussian Mixture Sigma-Point Particle Filters for Sequential Probabilistic Inference in Dynamic State-Space Models," Apr. 2003.

(Continued)

*Primary Examiner*—Michael J. Zanelli
(74) *Attorney, Agent, or Firm*—Stoel Rives LLP

(57) ABSTRACT

A method of estimating the navigational state of a system entails acquiring observation data produced by noisy measurement sensors and providing a probabilistic inference system to combine the observation data with prediction values of the system state space model to estimate the navigational state of the system. The probabilistic inference system is implemented to include a realization of a Gaussian approximate random variable propagation technique performing deterministic sampling without analytic derivative calculations. This technique achieves for the navigational state of the system an estimation accuracy that is greater than that achievable with an extended Kalman filter-based probabilistic inference system.

31 Claims, 12 Drawing Sheets

OTHER PUBLICATIONS

Rudolph van der Merwe and Eric A. Wan, Oregon Graduate Institute of Science and Technology,"The Square Root Unscented Kalman Filter for State and Parameter-Estimation," May 2001.

Dr. Michael K. Martin and Bruce C. Detterich, "C-MIGITS™ II Design and Performance," The Satellite Division of The Institute of Navigation, Sep. 1997, pp. 1-8.

John L. Crassidis and F. Landis Markley,"Unscented Filtering for Spacecraft Attitude Estimation," *Journal of Guidance, Control, and Dynamics*, vol. 26, No. 4, Jul.-Aug. 2003, pp. 536-542.

Derek B. Kingston, Randal W. Beard, "Real-Time Attitude and Position Estimation for Small UAVs," 2004 IEEE American Control Conference.

Matthew D. Lichter and Steven Dubowsky, Department of Mechanical Engineering, Massachusetts Institute of Technology, "Estimation of state, shape, and inertial parameters of space objects from sequences of range images," Oct. 2003.

Marius Niculescu, Aerosonde Robotic Aircraft, Sensor Fusion Algorithms for Unmanned Air Vehicles, Nov. 13, 2001, pp. 1-8.

\* cited by examiner

NAVIGATION SYSTEM APPLICATIONS OF SIGMA-POINT KALMAN FILTERS FOR NONLINEAR ESTIMATION AND SENSOR FUSION

RELATED APPLICATION

This application claims benefit of U.S. patent application No. 60/559,708, filed Apr. 5, 2004.

FEDERALLY SPONSORED RESEARCH OR DEVELOPMENT

This invention was made with United States government support pursuant to Grant No. N00014-02-C-0248 from the Office of Naval Research, and Grant No. F33615-98-C-3516 from the Defense Advance Research Projects Agency. The United States has certain rights to this invention.

COPYRIGHT NOTICE

© 2005 Oregon Health and Sciences University. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application relates to estimating the navigational state of a system and, in particular, to applying a sigma-point Kalman filter (SPKF) based probabilistic inference framework to effect nonlinear estimation and sensor fusion in loosely coupled or tightly coupled integrated navigation systems.

BACKGROUND OF THE INVENTION

A core objective in the design of integrated navigation systems is optimal fusing of noisy observations from global positioning systems (GPS), inertial measurement units (IMU), and other sensors. Current navigation systems use the extended Kalman filter (EKF) as the standard technique for integrating sensor data. In an inertial navigation system (INS), the EKF combines gyroscope and accelerometer data from an IMU with a kinematics or dynamic model of a vehicle. Other sensors such as a barometric altimeter or magnetic compass may also be integrated. Supplied GPS position and velocity measurements are then integrated with the INS using the same EKF. Position, attitude, velocities, and sensor biases are all estimated. In addition, the GPS receiver may employ its own EKF to solve position and velocity estimates and timing from satellite pseudo-range, phase, and Doppler data. Alternatively, in a tightly coupled approach, a single EKF may be used to combine raw satellite signals with the IMU and other sensor measurements to make an optimal estimation. Unfortunately, the EKF is based on a suboptimal implementation of the recursive Bayesian estimation framework applied to Gaussian random variables. The EKF achieves only first order accuracy in the calculation of the posterior mean and covariance of the transformed random variables. This can seriously affect the accuracy or even lead to divergence of the system.

The basic framework for the EKF entails estimation of the state of a discrete-time nonlinear dynamic system $$x_{k+1}=F(x_k,v_k)$$

$$y_k=H(x_k,n_k),$$

where $x_k$ represents the unobserved state of the system and $y_k$ is the only observed signal. The process noise $v_k$ drives the dynamic system, and the observation noise is given by $n_k$. Additivity of the noise sources is not assumed. The system dynamic model F and H are assumed known. In state estimation, the EKF is the standard method of choice to achieve a recursive approximate maximum-likelihood estimation of the state $x_k$. Given the noisy observation $y_k$, the recursive estimation for $x_k$ can be expressed in the form $$\hat{x}_k=\text{(optimal prediction of }x_k\text{)}+\kappa_k[y_k-\text{(optimal prediction of }y_k\text{)}].$$

This recursion provides the optimal minimum mean-squared error estimate for $x_k$, assuming the prior estimate of $\hat{x}_{k-1}$, and current observation $y_k$ are Gaussian random variables (GRVs). Linearity of the model need not be assumed. The optimal terms in this recursion are given by $$\hat{x}_k^-=E[F(\hat{x}_{k-1},v_{k-1})] \quad \kappa_k=P_{x_ky_k}P_{\tilde{y}_k\tilde{y}_k}^{-1} \quad \hat{y}_k^-=E[H(\hat{x}_k^-,n_k)],$$

where the optimal prediction of $x_k$ is written as $\hat{x}_k^-$ and corresponds to the expectation of a nonlinear function of the random variables $\hat{x}_{k-1}^-$ and $v_{k-1}$ (similar interpretation for the optimal prediction $\hat{y}_k^-$). The optimal gain term $\kappa_k$ is expressed as a function of posterior covariance matrices (with $\tilde{y}_k=y_k-\hat{y}_k$). These terms also require taking expectations of a nonlinear function of the prior state estimates. The Kalman filter calculates these quantities exactly in the linear case and can be viewed as an efficient method for analytically propagating GRV through linear system dynamics. For nonlinear models, however, the EKF approximates the optimal terms as:

$$\hat{x}_k^- \approx F(\hat{x}_{k-1},\bar{v}) \quad \kappa_k \approx \hat{P}_{x_ky_k}\hat{P}_{\tilde{y}_k\tilde{y}}^{-1} \quad \hat{y}_k^- \approx H(\hat{x}_k^-,\bar{n}),$$

where predictions are approximated as simply the function of the prior mean value for estimates (no expectation taken). The noise means are denoted by $\bar{n}=E[n]$ and $\bar{v}=E[v]$ and are usually assumed to be equal to zero. The covariances are determined by linearizing the dynamic equations ($x_{k+1}\approx Ax_k+Bv_k$, $y_k\approx Cx_k+Dn_k$) and then determining the posterior covariance matrices analytically for the linear system. In other words, in the EKF, the state distribution is approximated by a GRV, which is then propagated analytically through the "first-order" linearization of the nonlinear system. As such, the EKF can be viewed as providing "first-order" approximations to the optimal terms. (While "second-order" versions of the EKF exist, their increased implementation and computational complexity tend to prohibit their use.) These approximations can, however, introduce large errors in the true posterior mean and covariance of the transformed (Gaussian) random variable, which may lead to sub-optimal performance and sometimes divergence of the filter.

Julier, S., Uhlmann, J., and Durrant-Whyte, H., "A New Approach for Filtering Nonlinear Systems," in *Proceedings of the American Control Conference* (1995), derived a novel, more accurate, and theoretically better grounded alternative to the EKF called the unscented Kalman filter (UKF) for state estimation within the application domain of nonlinear control. The UKF addresses the approximation issues of the EKF. The state distribution is again represented by a GRV but is now specified using a minimal set of carefully chosen sample points, called sigma points. These sigma points completely capture the true mean and covariance of the GRV, and when propagated through the true nonlinear system, capture the posterior mean and covariance accurately to the third order (Taylor series expansion) for any nonlinearity. The UKF can be explained by considering propagating a random variable x (dimension L) through a nonlinear function, y=g(x), and assuming x has mean $\bar{x}$ and covariance $P_x$. To calculate the statistics of y, a matrix $\chi$ of 2L+1 sigma vectors $\chi_i$ (with corresponding weights $W_i$) is formed, according to the following:

$$\chi_0 = \bar{x} \quad W_0^{(m)} = \lambda(L+\lambda)^{-1}$$

$$\chi_i = \bar{x} + (\sqrt{(L+\lambda)P_x})_i \, i=1,\ldots,L \quad W_0^{(c)} = \lambda(L+\lambda)^{-1} + (1-\alpha^2+\beta)$$

$$\chi_i = \bar{x} - (\sqrt{(L+\lambda)P_x})_{i-L} \, i=L+1,\ldots,2L \quad W_i^{(m)} = W_i^{(c)} = 0.5(L+\lambda)^{-1} \, i=1,\ldots,2L$$

where $\lambda = \alpha^2(L+\kappa) - L$ is a scaling parameter. $\alpha$ determines the spread of the sigma points around $\bar{x}$ and is usually set to a small positive value (e.g. $1 \leq \alpha \leq 1e-3$). $\kappa$ is a secondary, scaling parameter that is usually set to 0, and $\beta$ is used to incorporate prior knowledge of the distribution of x (for Gaussian distributions, $\beta=2$ is optimal). The optimal value of $\beta$ is a function of the kurtosis of the prior random variable. $(\sqrt{(L+\lambda)P_x})_i$ is the ith row of the matrix square root. These sigma vectors are propagated through the nonlinear function $$\chi_0 = \bar{x} \qquad W_0^{(m)} = \lambda(L+\lambda)^{-1}$$

$$\chi_i = \bar{x} + \left(\sqrt{(L+\lambda)P_x}\right)_i \qquad W_0^{(c)} = \lambda(L+\lambda)^{-1} + (1-\alpha^2+\beta)$$

$$i = 1,\ldots,L$$

$$\chi_i = \bar{x} - \left(\sqrt{(L+\lambda)P_x}\right)_{i-L} \quad W_i^{(m)} = W_i^{(c)} = 0.5(L+\lambda)^{-1}$$

$$i = L+1,\ldots,2L \qquad i = 1,\ldots,2L$$

and the mean and covariance of y are approximated using a weighted sample mean and covariance of the posterior sigma points $$\bar{y} \approx \sum_{i=0}^{2L} W_i^{(m)} \Upsilon_i \qquad P_y \approx \sum_{i=0}^{2L} W_i^{(c)} (\Upsilon_i - \bar{y})(\Upsilon_i - \bar{y})^T.$$

This specific implementation of the general sigma-point approach for calculating posterior statistics, is called the unscented transformation (UT) [Julier 1995]. The sigma-point approach differs substantially from general "sampling" methods (e.g., Monte-Carlo methods and grid-based filters), which require orders of magnitude more sample points in an attempt to propagate an accurate (possibly non-Gaussian) distribution of the state. The deceptively simple approach results in approximations that are accurate to the third order for Gaussian inputs for all non-linearities. For non-Gaussian inputs, approximations are accurate to at least the second-order, with the accuracy of third and higher order moments determined by the choice of $\alpha$ and $\beta$. A simple example is shown in FIG. 1 for a two-dimensional system. The left-hand plots show the true mean and covariance propagation using Monte-Carlo sampling; the middle plots show the results using a linearization approach as would be done in the EKF; and the right-hand plots show the performance of the sigma-point approach (only 5 sigma points required for L=2). The superior performance of the sigma-point approach is clear.

The sigma-point Kalman filter (SPKF) is a better alternative to the EKF for Gaussian approximate probabilistic inference in general nonlinear dynamic state-space models. SPKF is a family of Kalman filters using derivativeless deterministic sampling for Gaussian approximate nonlinear estimation. The sigma-point approach is the underlying unifying technique that is common to SPKFs and is a method of calculating the statistics of a random variable that undergoes a nonlinear transformation. These calculations form the core of the optimal Kalman time and measurement equations, which are simply the original (optimal) recursive Bayesian estimation integral equations recast under a Gaussian assumption.

The sigma-point approach for approximating the statistics of a random variable that undergoes a nonlinear transformation is summarized by the following three steps:

1. A set of weighted sigma-points is deterministically calculated using the mean and square-root decomposition of the covariance matrix of the prior random variable. As a minimal requirement, the sigma-point set completely captures the first and second order moments of the prior random variable. Higher order moments can be captured, if so desired, at the cost of using more sigma-points.

2. The sigma-points are then propagated through the true nonlinear function using functional evaluations alone, i.e., no analytical derivatives are used, to generate a posterior sigma-point set.

3. The posterior statistics are calculated (approximated) using tractable functions of the propagated sigma-points and weights.

When the UT implementation of the sigma-point approach is used, the resulting filter is the UKF. The UKF is one specific implementation of SPKF.

The superior performance of the sigma-point approach would make desirable an application of SPKF to nonlinear estimation and sensor fusion in the operation of vehicle navigation systems.

SUMMARY OF THE INVENTION

An object of the invention is to provide a method of estimating the navigational state of a system with an accuracy that is greater than that achievable with an extended Kalman filter-based probabilistic inference system.

The present invention is a method of estimating the navigational state of a system. The navigational state is characterized by random variables of a state space model that specifies a time evolution of the system and its relationship to sensor observations. The method entails acquiring observation data produced by measurement sensors that provide noisy information about the navigational state of the system and providing a probabilistic inference system to combine the observation data with prediction values of the system state space model to estimate the navigational state of the system. The probabilistic inference system is implemented to include a realization of a Gaussian approximate random variable propagation technique performing deterministic sampling without analytic derivative calculations. This technique achieves for the navigational state of the system an estimation accuracy that is greater than that achievable with an extended Kalman filter-based probabilistic inference system.

In a preferred embodiment, the measurement sensors include an inertial measurement unit (IMU) that operates to estimate a set of navigational state components. The navigational state component set includes angular velocity and attitude information relating to an object in motion and bias and scale factor information associated with the IMU. The random variable propagation technique of the probabilistic inference system used to estimate the navigational state of the system includes using mean values and square root decomposition of a covariance matrix of a prior random variable to deterministically calculate a set of sigma-points and an associated set of weight values. The calculated set of weighted sigma-points is propagated through a nonlinear state space model to produce a posterior set of weighted sigma-points used to calculate posterior statistics. The calculation of posterior statistics entails the use of closed form functions of the propagated sigma-points and weight values. The calculated posterior statistics give an approximately optimal update of the navigational state and its covariance by combining the prediction values of the system state space model and the sensor observations.

A preferred embodiment implements a SPKF based latency delayed sensor fusion technique for situations in which the observation data provide noisy information about the navigational state of the system at a time that lags a current time because of sensor latency. The method entails maintaining a cross correlation between a navigational state of the system at a current time and the navigational state to which the latency lagged observation data correspond and uses the cross correlation to optimally combine latency lagged observation data with the prediction values of the system state space model.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
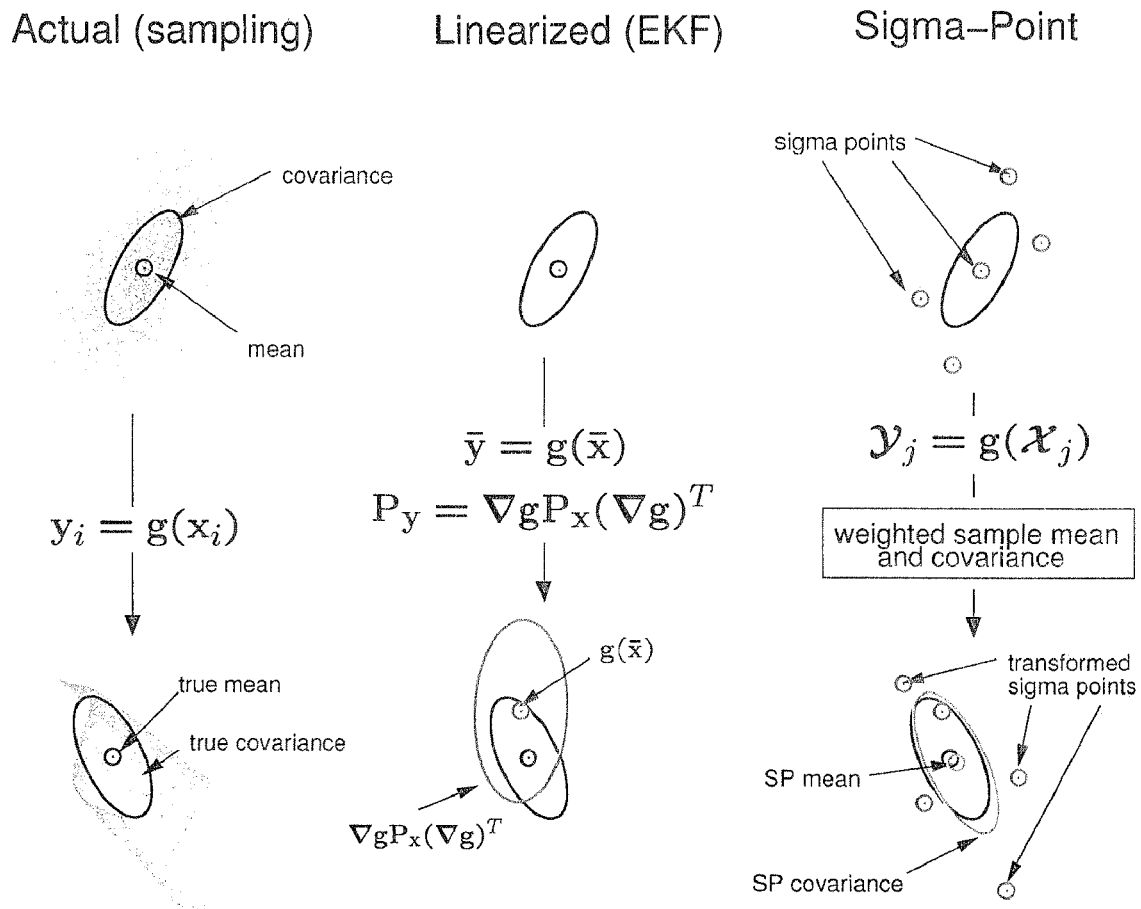
FIG. 1 shows the accuracy of a scaled unscented transformation for mean and covariance propagation of a Gaussian random variable through an arbitrary nonlinear function.
Figure 2:
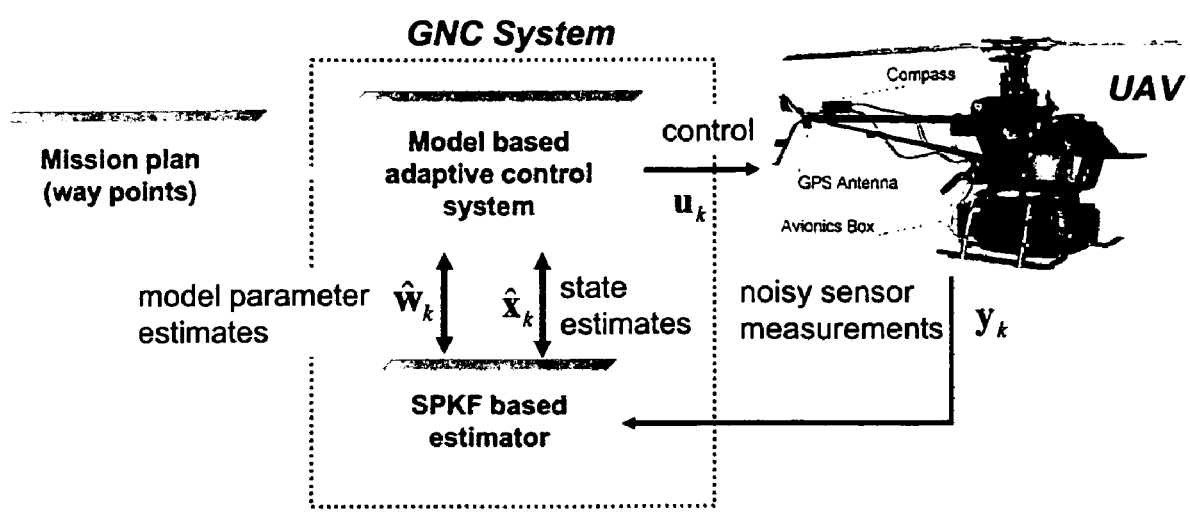
FIG. 2 is a pictorial block diagram of an unmanned aerial vehicle (UAV) guidance, navigation, and control (GNC) system in which a preferred embodiment of the invention is implemented.

A preferred embodiment of the method of estimating the navigational state of a system is carried out in application of the SPKF to a loosely coupled implementation of guidance and navigation system (GNS) for unmanned aerial vehicle autonomy (UAV), specifically an autonomous small-scale helicopter. The core component of such a UAV is a high-performance digital computer based guidance, navigation, and control (GNC) system as shown schematically in FIG. 2. The main subsystems of the GNC system are a control system (CS) and a guidance and navigation system (GNS). The GNS takes noisy avionics sensor measurements (e.g., GPS, IMU, and altimeter) as inputs, and then fuses them in a probabilistic sense with predictions from a vehicle dynamics model to calculate optimal vehicle navigation state solutions. The term "fuse" refers to the Kalman optimal combination of the prior state estimate with the new information contained in the sensor measurement. This is achieved through the Kalman measurement-update step. These state estimates, together with desired flight trajectories, are then applied to the control system, which computes some form of optimal control law to drive the flight surface actuators of the vehicle. This GNS is considered a loosely coupled GPS/INS (inertial navigation system) integration because the processing internal to the GPS is done independently of other sensor measurements. A computer readable memory storing instructions for configuring a signal processing system is preferably used to perform the method. The computer readable memory can include magnetic media (such as floppy disk or a hard drive), optical media (such as a CD or a DVD) or electronic media (such as rewritable or non-rewritable memory).

The current state-of-the-art probabilistic inference systems used for such UAV guidance and navigation systems are usually EKF based. The experimental platform, which was developed by the Aerial Robotics Group at the MIT Laboratory for Information and Decision Systems, was built around an EKF based GNS implementation. Real-world experimental verification of the operation of the SPKF entailed replacement of the EKF in the UAV-GNC system by a SPKF and comparison of its performance to an existing EKF base-line system, with specific focus on: 1) improved six-degrees-of-freedom (6DOF) state estimation accuracy, 2) SPKF based compensation for GPS latency, 3) evaluation of improved control envelope resulting from use of a better state estimator, and 4) robustness to IMU degradation. The vehicle dynamic process model and the avionics sensor models for use inside the SPKF based state estimator are described below.

Vehicle State-Space Process Model: Because of its high computational complexity, a high-fidelity nonlinear dynamic model of UAV movement is not ideally suited for use within the navigation filter loop. (The Experimental Results section presented below describes use of a high-fidelity (70 parameters, 43 states) nonlinear dynamic model of UAV movement for UAV simulators and control system design.) For this reason, applicants opted for the standard IMU driven kinematic process model formulation that comprises an INS mechanization component and a IMU sensor error model component. Because low cost MEMS-based IMUs such as the one used in the avionics system have large bias and scale factor errors, these components are included into the state vector to be estimated.

The estimated values of these error components are then used to correct the raw IMU acceleration and gyroscope-rate measurements before they are used inside the INS mechanization equations of the process model. The 16 dimensional state vector of this model is given by $$x=[p^T v^T e^T a_b^T \omega_b^T],$$

where $p=[x\ y\ z]^T$ and $v=[v_x\ v_y\ v_z]^T$ are the respective position and velocity vectors of the vehicle in the navigation frame, $e=[e_0\ e_1\ e_2\ e_3]^T$ is the unity norm vehicle attitude quaternion, $a_b=[a_{x_b}\ a_{y_b}\ a_{z_b}]^T$ is the vector of IMU acceleration biases, and $\omega_b=[p_b\ q_b\ r_b]^T$ is the IMU gyroscope rate bias vector. Although a separate scale factor can be included in addition to the bias term in the state vector, applicants' experiments demonstrated that it is sufficient to model the combined effect of the bias and scale error terms as a single time-varying bias term.

The continuous time kinematic navigation equations (INS mechanization equations and error model) operating on this state vector and driven by the error corrected IMU measurements are given below:

$$\dot{p} = v \quad (1)$$

$$\dot{v} = C_b^n(\bar{a} - a_{\bar{r}_{imu}}) + [0\ 0\ 1]^T g \quad (2)$$

$$\dot{e} = -\frac{1}{2}\tilde{\Omega}_{\bar{\omega}} e \quad (3)$$

$$\dot{a}_b = w_{a_{b_k}} \quad (4)$$

$$\dot{\omega}_b = w_{\omega_{b_k}}. \quad (5)$$

$C_b^n$ is the direction cosine matrix (DCM) transforming vectors from the body frame to the navigation frame. The DCM is a nonlinear function of the current attitude quaternion and is given by $$C_b^n = (C_n^b)^T = 2\begin{bmatrix} 0.5 - e_2^2 - e_3^2 & e_1 e_2 - e_0 e_3 & e_1 e_3 + e_0 e_2 \\ e_1 e_2 + e_0 e_3 & 0.5 - e_1^2 - e_3^2 & e_2 e_3 - e_0 e_1 \\ e_1 e_3 - e_0 e_2 & e_2 e_3 + e_0 e_1 & 0.5 - e_1^2 - e_2^2 \end{bmatrix}.$$

The term g is the gravitational acceleration component, and $\bar{a}$ and $\bar{\omega}$ are the bias and noise corrected IMU accelerometer and gyroscope rate measurements, i.e., $$\bar{a} = \tilde{a} - a_b - n_a$$

$$\bar{\omega} = \tilde{\omega} - \omega_b - C_n^b \omega_c - n_\omega.$$

In the above equations, $\tilde{a}$ and $\tilde{\omega}$ are the raw measurements coming from the IMU, $n_a$ and $n_\omega$ are the IMU acceleration and gyroscope-rate measurement noise terms, and $\omega_c$ is the rotational rate of the earth as measured in the navigation frame (Coriolis effect). In general, $\omega_c$ is a function of the location of the navigational frame relative to the earth frame and hence is time-varying as the navigation frame moves relative to the earth frame. However, for their purposes (aggressive autonomous UAV flight within a very small airspace volume), applicants assumed that the navigation frame does not change relative to the earth frame, resulting in a constant $\omega_c$ for a given origin location (lat/long) of the navigation frame. $\tilde{\Omega}_{\bar{\omega}}$ is a 4×4 skew-symmetric matrix composed of the error corrected IMU gyro-rate measurements, i.e., $$\tilde{\Omega}_{\bar{\omega}} = \begin{bmatrix} 0 & \bar{\omega}_p & \bar{\omega}_q & \bar{\omega}_r \\ -\bar{\omega}_p & 0 & -\bar{\omega}_r & \bar{\omega}_q \\ -\bar{\omega}_q & \bar{\omega}_r & 0 & -\bar{\omega}_p \\ -\bar{\omega}_r & -\bar{\omega}_q & \bar{\omega}_p & 0 \end{bmatrix}.$$

In Eq. (2), $a_{\bar{r}_{imu}}$ is the IMU-lever-arm coupling component resulting from locating the IMU not at the center of gravity of the vehicle. This component can be ignored if the navigation filter computes the state estimate at the IMU location. This IMU centric navigation solution can then simply be transformed to the center of gravity location after the fact as needed by the vehicle control system.

The final components of the process model, Eqs. (4) and (5), model the time-varying nature of the IMU sensor bias error terms. Usually, sensor errors in an INS are modeled as a zero-mean, stationary, first-order Gauss-Markov process. Since the biases and scale factors of low cost MEMS-based IMU sensors exhibit non-zero mean and non-stationary behavior, the errors are modeled as a random walk to improve the tracking of these time-varying errors by the navigation filter. This does require, however, that the effect of these errors be observable through the specific choice of measurement model.

The position and velocity discrete-time updates are calculated by the following simple first-order Euler update $$p_{k+1} = p_k + \dot{p}_k \cdot dt$$

$$v_{k+1} = v_k + \dot{v}_k \cdot dt,$$

where $\dot{p}_k$ and $\dot{v}_k$ are calculated using Eqs. (1) and (2) and dt is the integration time-step of the system (in this system the integration time-step was dictated by the IMU rate, i.e., dt=10 ms). The quaternion propagation equation can be expressed in discrete form with an analytical calculation of the exponent of the skew-symmetric matrix given by Stevens, B. and Lewis, F., *Aircraft Control and Simulation*, New York, N.Y.: Wiley, 1992. The discrete-time update can be written as $$e_{k+1} = \exp\left(-\frac{1}{2}\tilde{\Omega}\cdot dt\right)e_k. \quad (6)$$

Further denoting $$\Delta\phi = \bar{\omega}_p \cdot dt$$

$$\Delta\theta = \bar{\omega}_q \cdot dt$$

$$\Delta\psi = \bar{\omega}_r \cdot dt,$$

as effective rotations around the (body frame) roll, pitch, and yaw axes undergone by the vehicle during the time period dt, assuming that the angular rates $\bar{\omega}_p$, $\bar{\omega}_q$, and $\bar{\omega}_r$ remained constant during that interval, one can introduce the 4×4 skew-symmetric matrix $$\Phi_\Delta = \tilde{\Omega} \cdot dt = \begin{bmatrix} 0 & \Delta\phi & \Delta\theta & \Delta\psi \\ -\Delta\phi & 0 & -\Delta\psi & \Delta\theta \\ -\Delta\theta & \Delta\psi & 0 & -\Delta\phi \\ -\Delta\psi & -\Delta\theta & \Delta\phi & 0 \end{bmatrix}.$$

Using the definition of the matrix exponent and the skew symmetric property of $\Phi_\Delta$, one can write down the following closed-form solution:

$$\exp\left(-\frac{1}{2}\Phi_\Delta\right) = I\cos(s) - \frac{1}{2}\Phi_\Delta \frac{\sin(s)}{s}, \quad (7)$$

where $$s = \frac{1}{2}\|[\Delta\phi \; \Delta\theta \; \Delta\psi]\| = \frac{1}{2}\sqrt{(\Delta\phi)^2 + (\Delta\theta)^2 + (\Delta\psi)^2}.$$

Eqs. (6) and (7) ensure (at least theoretically) that the updated quaternion $e_{k+1}$ has a unit norm. However, a small Lagrange multiplier term can be added to the first component of Equation 7 to further maintain numerical stability and the unity norm of the resulting quaternion. The resulting final solution for the time-update of the quaternion vector is given by $$e_{k+1} = \left[I(\cos(s) + \eta \cdot dt \cdot \lambda) - \frac{1}{2}\Phi_\Delta \frac{\sin(s)}{s} e_k\right],$$

where $$\lambda = 1 - \|e_k\|^2$$

is the deviation of the square of the quaternion norm from unity resulting from numerical integration errors, and $\eta$ is the factor that determines the convergence speed of the numerical error. These factors serve the role of the above mentioned Lagrange multiplier that ensures that the norm of the quaternion remains close to unity. The constraint on the speed of convergence for stability of the numerical solution is $\eta \cdot dt < 1$.

Finally, the discrete time random-walk process for the IMU sensor error terms is given by $$a_{b_{k+1}} = a_{b_k} + dt \cdot w_{a_{bk}}$$

$$\omega_{b_{k+1}} = \omega_{b_k} + dt \cdot w_{\omega_{bk}},$$

where $w_{a_{bk}}$ and $w_{\omega_{bk}}$ are zero-mean Gaussian random variables.

These navigation equations are considered a direct formulation, as opposed to the alternative indirect (error) formulation. This choice was made for consistency with the MIT EKF implementation mentioned above.

Observation Models: The system made use of two independent avionic sensors to aid the INS: a 10 Hz, 50 ms latency GPS (Ashtech G12) and a barometric altimeter that measures absolute altitude as a function of ambient air pressure. The observation models used in our system for these sensors (described below) are highly nonlinear, making the use of the SPKF framework again preferable to an EKF solution.

GPS: Since our GPS antenna is not located at the same location in the body frame as the IMU, it not only observes the position and velocity of the body in the navigation frame, but also the attitude of the body relative to the navigation frame because of the "lever-arm effect." More specifically, the GPS observation model is given by:

$$p_k^{GPS} = p_{k-N} + C_b{}^n \tilde{r}_{gps} + n_{pk} \quad (8)$$

$$v_k^{GPS} = v_{k-N} + C_b{}^n \omega_{k-N} \times \tilde{r}_{gps} + n_{v_k} \quad (9)$$

where $p_{k-N}$ and $v_{k-N}$ are the time-delayed (by N samples due to sensor latency) 3D navigation-frame position and velocity vectors of the vehicle, $\tilde{r}_{gps}$ is the location of the GPS antenna in the body frame (relative to the IMU location), $\omega_{k-N}$ are the true rotational rates of the vehicle at time k–N, and $n_{pk}$ and $n_{v_k}$ are stochastic measurement noise terms. The noise terms are modeled as being time-dependent because the accuracy of observations varies over time according to the current PDOP value of the loosely coupled GPS solution. Since the DCM, $C_b{}^n$, in Eqs. (8) and (9) are a function of the attitude quaternion, the GPS measurements provide information not only of the position and velocity of the vehicle, but also of its attitude. This removes the need for an absolute attitude sensor such as a magnetic compass or tilt-sensor. However, this will also result in the non-observability of the IMU sensor errors during prolonged periods of GPS outages, which in turn can lead to significant INS drift.

The time delay (N samples) in the GPS model equations results from the internal GPS processing latency inherent to all loosely coupled GPS solutions. This implies that the latest GPS measurement relates to the state of the vehicle as it was a number of samples in the past. If the specific latency of the GPS is small, it can (and often is) ignored. If the latency is significant, however, care is taken when fusing this lagged information with the current estimate of the state of the vehicle in the measurement update step of the Kalman filter.

Barometric altimeter: Ambient air pressure provides an accurate source of sea-level altitude information. Important sources of error are sensor quantization and measurement noise. A high-end altimeter with $10^{-3}$ psi (0.6 meter) resolution was used. The measurement noise was assumed to be zero-mean, white, and Gaussian. The observation model that incorporates these effects are:

$$z_k^{alt} = -\frac{1}{\varphi}\ln\left[\frac{\rho_0^q \lfloor(\rho_0 \exp(\varphi \cdot z_k) + n_{z_a})/\rho_0^q\rfloor}{\rho_0}\right],$$

where $\rho_0$ is the nominal air pressure at sea-level, $\phi$ is the pressure decay rate with altitude constant ($1.16603 \times 10^{-4}$ psi/m), $z_k$ is the current navigation-frame z-axis position of the vehicle, $\rho_0^q$ is the air pressure quantization resolution of the altimeter ($10^{-3}$ psi), $z_k^{alt}$ is the altimeter output and $\lfloor \cdot \rfloor$ is the integer flooring function. This model is not only a nonlinear function of the state, but the measurement noise also effects the output altitude measurement in a non-additive fashion. Again, for such a model the use of the SPKF not only allows for a much simpler implementation than the EKF (no analytical derivatives need to be calculated), but also results in more accurate estimation results. Nonlinear sensor effects such as quantization and compressions are all readily incorporated within the Kalman estimation framework using the inherently nonlinear modeling capability of SPKFs.

The MIT designed, fine-tuned EKF was replaced in the helicopter vehicle with a SPKF based state estimator to implement the present invention. The state estimator uses the above-described nonlinear kinematic process model and observation models of the GPS and barometric altimeter. The state estimator is of a square-root central difference Kalman filter (SR-CDKF) SPKF formulation because of its ease of implementation, intuitive choice of scaling parameters, and numerical robustness. The SR-CDKF algorithm is set forth below as Algorithm 4.

There are a number of problem specific issues that are dealt with in adapting the general SPKF framework to the UAV state estimation problem. The important ones include asynchronicity, differing sample rates, and time-varying dimension of sensor observations; filter initialization; GPS latency; and quaternion unity norm constraint.

The first issue is measurement asynchronicity, varying sample rates, and time-varying dimensions. Unlike well behaved synthetic laboratory experiments, the UAV avionics system operates on an asynchronous message passing principle. Although the main system (and filter) is clocked at the IMU rate (100 Hz), the avionic sensors (GPS and altimeter) operate not only asynchronously from this clock, but their measurements are also provided at different sampling rates (10 Hz and 20 Hz respectively). This in turn implies that every filter cycle does not necessarily have both a time-update and a measurement-update step. Every time a new IMU measurement becomes available (roughly every 10 ms), the filter undergoes a time-update using the IMU driven kinematic process model, but a measurement-update is done only if there are actually new sensor data available for processing. The flight-computer polls the navigational sensors (or their simulation equivalents) to determine whether new data are available, and if so, update a bank of sensor buffers with these new measurements. These measurements are accompanied by a unique time-stamp if new data were written into the sensor buffers.

Based on these time-stamps and prior knowledge of the different update rates of the sensors, the estimator system builds up an adaptive event-map of when to expect new data from the different sensors. This event-map, which is built up during the filter initialization stage, is used in dealing with the GPS latency problem.

Since the different sensors have different observation vector dimensions (GPS has six dimensions, and altimeter has one dimension) and operate at different rates, the SPKF observation model for any given measurement update is configured to adapt to this time-varying total observation dimension. If both sensors report new data, the effective observation model (and its measurement noise random variable) will be a concatenation of the individual sensor observation models and sigma-points will be drawn from this augmented observation state (true 16D state and augmented noise state). It might also be the case that only one sensor (either the GPS or altimeter) reports new data for a given measurement update, resulting in the observation model (and the related SPKF based measurement update sigma-point generation) reverting to the relevant single sensor model. This time-varying observation model requires careful book-keeping of sensor events to accurately adapt the filter to the time-varying nature of the sensor data stream.

The second issue is filter initialization. During the initialization of the navigation filter (state estimator), sensor data are observed and processed over a number of seconds while the UAV is at rest on the ground in a known position and attitude. This step contributes to ensuring robust performance of the filter during subsequent aggressive maneuvers.

The initial position estimate, $\hat{p}_0 = [\hat{x}_0 \hat{y}_0 \hat{z}_0]^T$, in the NED frame is based solely on the averaged GPS position measurements for the first couple of seconds while the UAV is stationary. The initial NED frame velocity estimate, $\hat{v}_0 = [\hat{v}_{x_0} \hat{v}_{y_0} \hat{v}_{z_0}]_0$, is initialized to zero. The helicopter is oriented into a known yaw direction (either due north or due south) with the x–y (horizontal) plane level (using two spirit levels) during the initialization phase. This allows the initial quaternion estimate, $\hat{e}_0 = [\hat{e}_{0_0} \hat{e}_{1_0} \hat{e}_{2_0} \hat{e}_{3_0}]^T$, to be set to a known value such as $\hat{e}_0 = [1\ 0\ 0\ 0]^T$. The averaged IMU accelerometer and gyroscope readings during the initialization period are used to initialize the estimates of the IMU bias variables. If the IMU is unbiased, the expected stationary accelerometer reading should be $a = [0\ 0\ -g]^T$ (where g is the local gravitational acceleration constant, i.e., 9.81 m/s$^2$) and the gyroscope rate readings (ignoring the rotation of the earth) should be zero. Any reading deviating from these expected values can then be used to initialize the bias estimates.

The final important house-keeping task performed during the initialization phase is the build up the "event map" for when to expect new data from the avionics sensors. This is done by monitoring the time-stamps of the sensor stream buffers over a period of time while the helicopter is stationary. A pre-specified number ($\approx$10) of sensor cycles are observed before the full event-map is robustly initialized. This in turn implies that the duration of this specific initialization phase is determined by the slowest sensor in the avionics system (in this case the GPS). As stated earlier, an accurate event map is also needed to accurately compensate for the inherent processing latency present in the GPS measurements.

Figure 3:
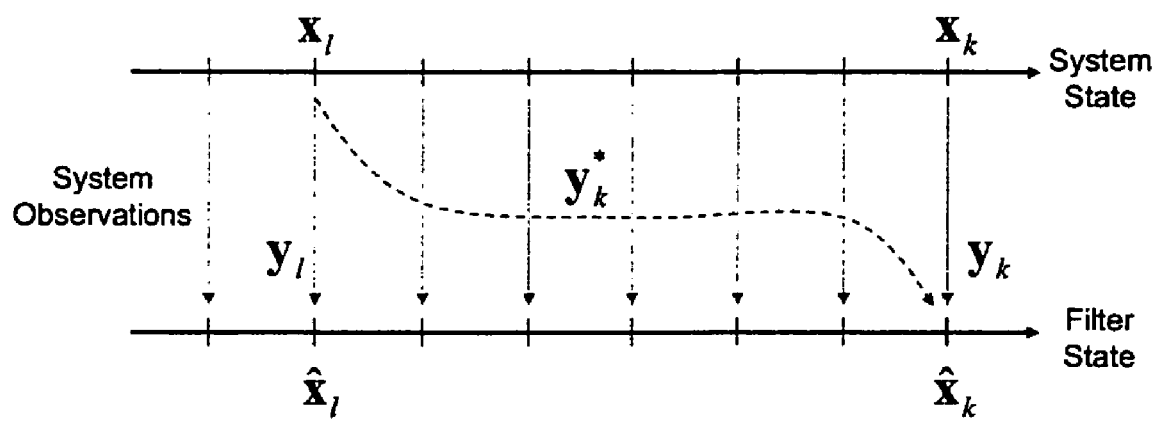
FIG. 3 is a schematic representation of sensor inherent latency manifested within a Kalman filter based estimation framework.

The third issue is GPS latency. One of the big challenges in building a robust state estimator is dealing with the inherent measurement latency of the GPS sensor. As previously mentioned, a GPS sensor has a finite processing delay between when a GPS satellite signal is received for processing and when the actual position and velocity measurement related to that signal becomes available. This implies that the current GPS reading actually corresponds to the position and velocity state of the vehicle at some point in the past. This time difference is called the measurement latency. For cheaper lower performance GPS systems, this latency can be in the order of couple of seconds, causing serious problems when these measurements are fused inside a Kalman filter with the current prediction of the vehicle state. FIG. 3 demonstrates this issue graphically for a linear dynamic state-space model given by $$x_{k+1} = A_k x_k + B_k u_k + v_k \quad (10)$$

$$y_k = C_k x_k + n_k, \quad (11)$$

where $v_k \sim N(O, R_v)$ and $n_k \sim N(O, R_n)$. The state estimation filter, in general, receives measurements from a variety of sensors at each measurement-update step. Some measurements corresponds to the system state at the current time, $y_k$, given by Equation (2), while other latency-delayed measurements, $y_k^*$, correspond to the system state at time $l = k - N$, i.e., $y_k^* = C_l^* x_l + n_k^*$, where N is the sensor latency measured in sample periods, $C_l^*$ is the measurement sensitivity matrix, and $n_k^*$ is the observation noise for the delayed measurement with $n_k^* \sim N(O, R_n)$.

FIG. 3 shows, for a system with delayed measurement resulting from sensor latency, that at time k, the state estimation filter receives two sets of sensor measurements from the system. A normal measurement $y_k$ corresponds to the system state at time k, and a delayed measurement $y_k^*$ corresponds to the system state at time l=k−N. The following presents a technique for optimally fusing these different sets of measurements with the current estimate of the system state.

SPKF based Sensor Latency Compensation: To fuse new information (innovation signal) resulting from a lagged sensor measurement, $\tilde{y}_{k-n}$, with the current prediction of the system state, $\hat{x}_k^-$, the following form of the Kalman measurement update equations is used:

$$\hat{x}_k = \hat{x}_k^- + \kappa_k \tilde{y}_{k-n}, \kappa_k = P_{x_k \tilde{y}_{k-n}}(P_{\tilde{y}_{k-n}})^{-1}, n=N_{lat}.$$

A key insight here is that the optimal Kalman gain in this case is a function of the cross-covariance between the current state and the latency lagged system state at the time the sensor measurement was made, $P_{x_k \tilde{y}_{k-n}}$. This quantity can be calculated using the sigma-point approach if the following state estimate and cross-covariance terms can be maintained accurately during the latency period:

$$\hat{x}_{k-n}, P_{x_k x_{k-n}}^- = E[(x_k - \hat{x}_k^-)(x_{k-n} - \hat{x}_{k-n})^T].$$

Figure 4:
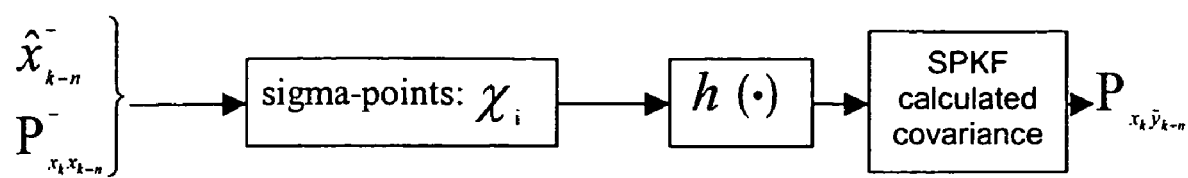
FIG. 4 is a process flow diagram showing the calculation of the cross-covariance using the sigma-point approach for sensor latency compensation.

The needed term in the optimal Kalman gain expression is then implicitly calculated using the sigma-point approach as shown in FIG. 4. To maintain the correct lagged state and lagged cross-covariance terms, one redefines the state-space model (process and observation equations) used internally by the SPKF. This is done by first augmenting the system state with the lagged state that must be maintained, i.e., $x_k^a = [x_k^T x_l^T]^T$. This is done when the lagged sensor makes its measurement, $N_{lat}$ discrete time periods before the measurement is available at the output of the sensor. The redefined system state-space model is given by:

$$x_{k+1}^a = \begin{bmatrix} f(x_k) \\ x_l \end{bmatrix} \quad y_k = \breve{h}(x_k^a) = \begin{cases} h_1(x_k) & k \neq l + N_{lat} \\ h_2(x_l) & k \neq l + N_{lat} \end{cases}.$$

The top half of the augmented state evolves according to the original nonlinear process model, while the bottom half (system state at measurement instance) is maintained at its initialized value during the latency period. The observation model states that normal (non latency lagged) sensor observations are functions of the normal propagated system state, i.e., $h_1(\bullet)$, whereas the latency lagged sensor (e.g., GPS), is a function of the bottom part of the augmented state, the lagged (maintained) value, i.e., it uses $h_2(\bullet)$. By redefining the system models as described above, and applying the normal SPKF filter time- and measurement-update equations throughout the latency period, the predicted augmented system state and covariance will have the following structure when the lagged sensor finally "reports in" at the end of the latency period at l=k−$N_{lat}$:

$$\hat{x}_k^{a-} = \begin{bmatrix} \hat{x}_k^- \\ \hat{x}_l^* \end{bmatrix} \quad P_{x_k^a}^- = \begin{bmatrix} P_{x_k x_k}^- & P_{x_k x_l}^- \\ P_{x_l x_k}^- & P_{x_l x_l}^- \end{bmatrix}$$

Performing a measurement-update at this point based on the lagged innovation signal will result in the following gain term:

$$P_{x_k^a \tilde{y}_l} = \begin{bmatrix} P_{x_k \tilde{y}_l} \\ P_{x_l \tilde{y}_l} \end{bmatrix}, \quad \kappa_k = P_{x_k^a \tilde{y}_l}(P_{\tilde{y}_l})^{-1} = \begin{bmatrix} P_{x_k \tilde{y}_l}^- & P_{\tilde{y}_l}^{-1} \\ P_{x_l \tilde{y}_l}^- & P_{\tilde{y}_l}^{-1} \end{bmatrix},$$

which contains the correct cross-covariance components needed to perform the fusion of the lagged innovation signal with the current system state. After this step, the bottom part of the augmented system state is re-initialized with the correctly updated state estimate, in anticipation of the next lagged-sensor cycle.

The fourth issue is SPKF based quaternion unity norm constraint. As mentioned earlier, the quaternion based attitude formulation has many benefits over an Euler-angle based formulation. These benefits do, however, come with the caveat that the unity norm of the estimated quaternion vector has to be maintained during the estimation process. There is an elegant method available to enforce this unity constraint that is ideally suited to the SPKF framework.

The pseudo-observation of the quaternion sub-vector of the full state vector is defined as $$z_e = \|e\|^2 \quad (12)$$
$$= e^T e$$
$$= e_0^2 + e_1^2 + e_2^2 + e_3^2,$$

i.e., the squared norm of the quaternion vector is directly observed. This is a pseudo-observation, however, because there is no actual sensor that can measure the norm of the true attitude quaternion. The true attitude quaternion should, however, always have a unity norm so that the observation can be forced at time k to be equal to one, i.e., $$z_{e,k} = 1$$

One can now calculate the difference (innovation signal) between the assumed known (observed) quaternion norm and that of the prediction of the observation based on the current estimate of the quaternion, i.e., $$\tilde{z}_{e,k} = z_{e,k} - \hat{z}_{e,k}^- \quad (13)$$
$$= 1 - E[\|\hat{e}_k^-\|^2]$$
$$= 1 - E[\hat{e}_{0,k}^2 + \hat{e}_{1,k}^2 + \hat{e}_{2,k}^2 + \hat{e}_{3,k}^2],$$

and update the vehicle state using a standard Kalman framework measurement update, i.e., $$\hat{x}_k = \hat{x}_k^- + K_e z_{e,k} - \tilde{z}_{e,k}^-.$$

This step can readily be incorporated into the the existing SPKF framework by simply augmenting the observation model with Equation (12) and concatenating the assumed unity observation to the end of the true observation vector. It is also convenient at this point to introduce a synthetic additive observation noise term, $n_e$, into the pseudo-observation equation for the quaternion norm, $$z_e = \|e\|^2 + n_e,$$

where $n_e$ is modeled as a zero-mean Gaussian random variable, i.e., $$n_e \sim N(n_e; 0, \sigma_{n_e}^2),$$

where $\sigma_{n_e}^2$ is the variance. The magnitude of the variance of this synthetic noise term will directly affect the "weighting" that the quaternion norm unity constraint receives in relation to the other observations. If the variance is set to zero, the SPKF will put a large weight (importance) on ensuring that the constraint is met, possibly to the detriment of other components in the state vector estimate. On the other hand, if the variance is set very high, the filter will largely discount the pseudo observation, resulting in poor quaternion regulation. The exact setting of this parameter should thus be determined in relation to the variances of the other observation noise terms in order to find an acceptable trade-off between the two extreme conditions.

Because of the quadratic form of the pseudo-observation nonlinearity, the SPKF (in contrast to the EKF) is ideally suited for this specific method of quaternion norm regulation. The SPKF generates exact results for quadratic nonlinearities, whereas the EKF results for the same nonlinearity are highly biased and inconsistent. Furthermore, the right hand term of Equation (13), $E[\hat{e}_{0,k}^2 + \hat{e}_{1,k}^2 + \hat{e}_{2,k}^2 + \hat{e}_{3,k}^2]$, can be calculated accurately at almost no extra computational cost by noticing that $$E[\hat{e}_{0,k}^2 + \hat{e}_{1,k}^2 + \hat{e}_{2,k}^2 + \hat{e}_{3,k}^2] = E[\hat{e}_{0,k}^2] + [\hat{e}_{1,k}^2] + [\hat{e}_{2,k}^2] + [\hat{e}_{3,k}^2]$$
$$= \hat{\sigma}_{e_0}^2 + \hat{\sigma}_{e_1}^2 + \hat{\sigma}_{e_2}^2 + \hat{\sigma}_{e_3}^2$$
$$= \text{trace}\{P_{e_k}\},$$

where $\hat{\sigma}_{e_i}^2$ is the variance of the ith component of the quaternion vector and $P_{e_k}$ is the sub-block of the estimated state covariance matrix that relates to the quaternion sub-vector. In other words $$P_{e_k} = E[(e_k - \hat{e}_k)(e_k - \hat{e}_k)^T],$$

where the indexes of the sub-vector estimate (and its covariance) relative to the full state vector estimate and covariance are given by $x = [p \ v \ e \ b_w \ b_a]^T$. Based on this result, the quaternion norm pseudo-observation augmentation of the observation model can be implemented without the need to propagate extra sigma-points for the calculation of the predicted observation and its covariance. These values already exist encapsulated and pre-calculated within the prediction of the state and its covariance. This in turn implies that this SPKF-centric quaternion norm regularization method can be implemented at almost no extra computational cost.

Experimental Results

The UAV platform is an R/C X-Cell 90 helicopter with custom avionics: Flight computer (300 MHz DSP400), Ashtech-G12 GPS (non-differential), Inertial Sciences ISIS-IMU, Honeywell Barometric altimeter, wireless Ethernet link, and custom servo board. However, to accurately compare the state estimation performance of the SPKF based navigation filter to a state-of-the-art "hand tuned" EKF solution, comparative studies were made using a high-fidelity vehicle simulator. Using a simulation environment for testing allows for repeatable and well controlled comparative experiments. This simulator (designed by MIT) is built around a quaternion based fully nonlinear model of small helicopter dynamics utilizing a 43 dimensional state vector and accounts for most forces and moments acting upon the vehicle. All actuators are also modeled. The model is parameterized by 70 discrete parameters, fit to the true dynamics of vehicle [Gavrilets, V., Mettler, B., and Feron, E., "Nonlinear Model for a Small-Size Acrobatic Helicopter," in *Proceedings of AIAA Guidance Navigation and Control Conference, Montreal, Canada* (August 2001)]. The vehicle control system makes use of a robust state dependent Ricatti-equation (SDRE) controller [Bogdanov, A., Wan, E. A., Carlsson, M., Zhang, Y., Kieburtz, R., and Baptista, A., "Model Predictive Neural Control of a High Fidelity Helicopter Model," in *Proceedings of AIAA Guidance Navigation and Control Conference* (2001)].

Figure 5:
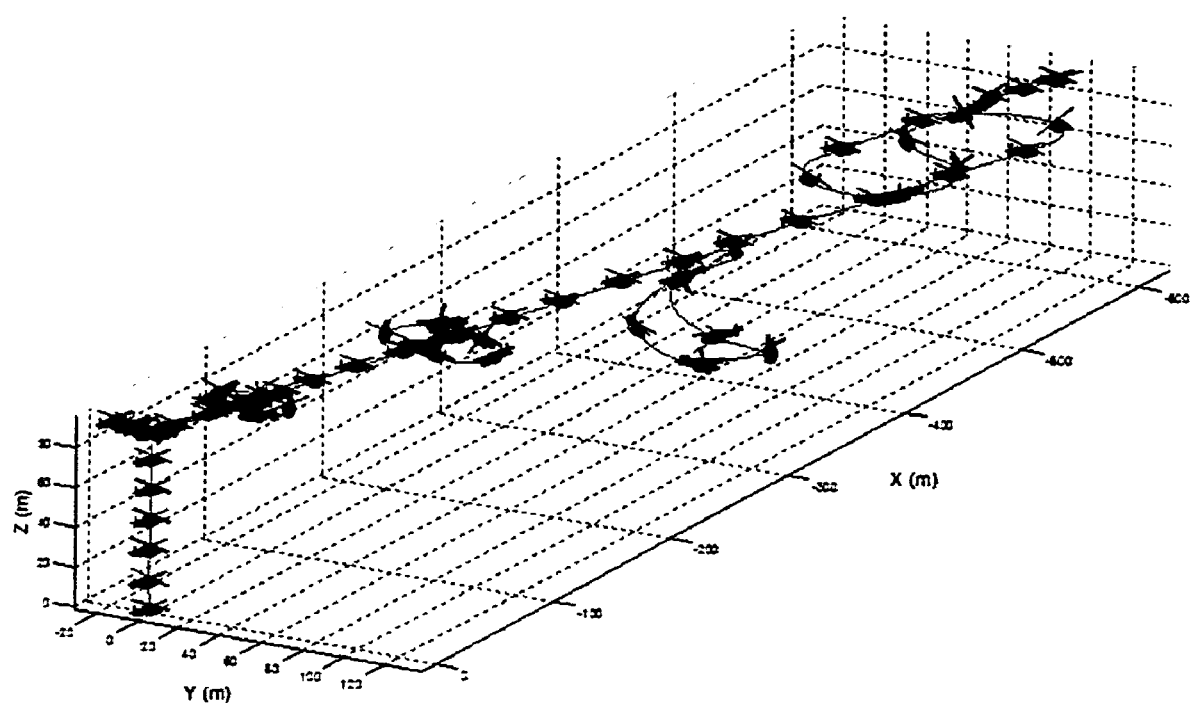
FIG. 5 is a graphical rendering of the helicopter flight trajectory used for state estimation experiments.

Experiment 1: In this experiment, the helicopter was flown in simulation along a complex trajectory that increased in "aggressiveness" over time (e.g., rapid-rise-and-hover, figure-eights, and split-s). A graphical rendering of this trajectory is shown in FIG. 5. The SDRE controller used the true known states of the vehicle for the online calculation of the control law, i.e., the SPKF or EKF estimated states were not fed back to the control system. This was done to ensure that the helicopter flew exactly the same flight profile when comparing the estimation performance of the different estimators, and is a main motivation for why the high-fidelity simulation environment is so attractive when comparing different estimation approaches.

| | Average RMS Error | | | | |
|---|---|---|---|---|---|
| | position | velocity | Euler angles (degrees) | | |
| Algorithm | (m) | (m/s) | roll | pitch | Yaw |
| EKF | 2.1 | 0.57 | 0.25 | 0.32 | 2.29 |
| SPKF - without LC | 1.9 (10%) | 0.52 (9%) | 0.20 (20%) | 0.26 (19%) | 1.03 (55%) |
| SPKF - with LC | 1.4 (32%) | 0.38 (34%) | 0.17 (32%) | 0.21 (34%) | 0.80 (65%) |

Figure 6:
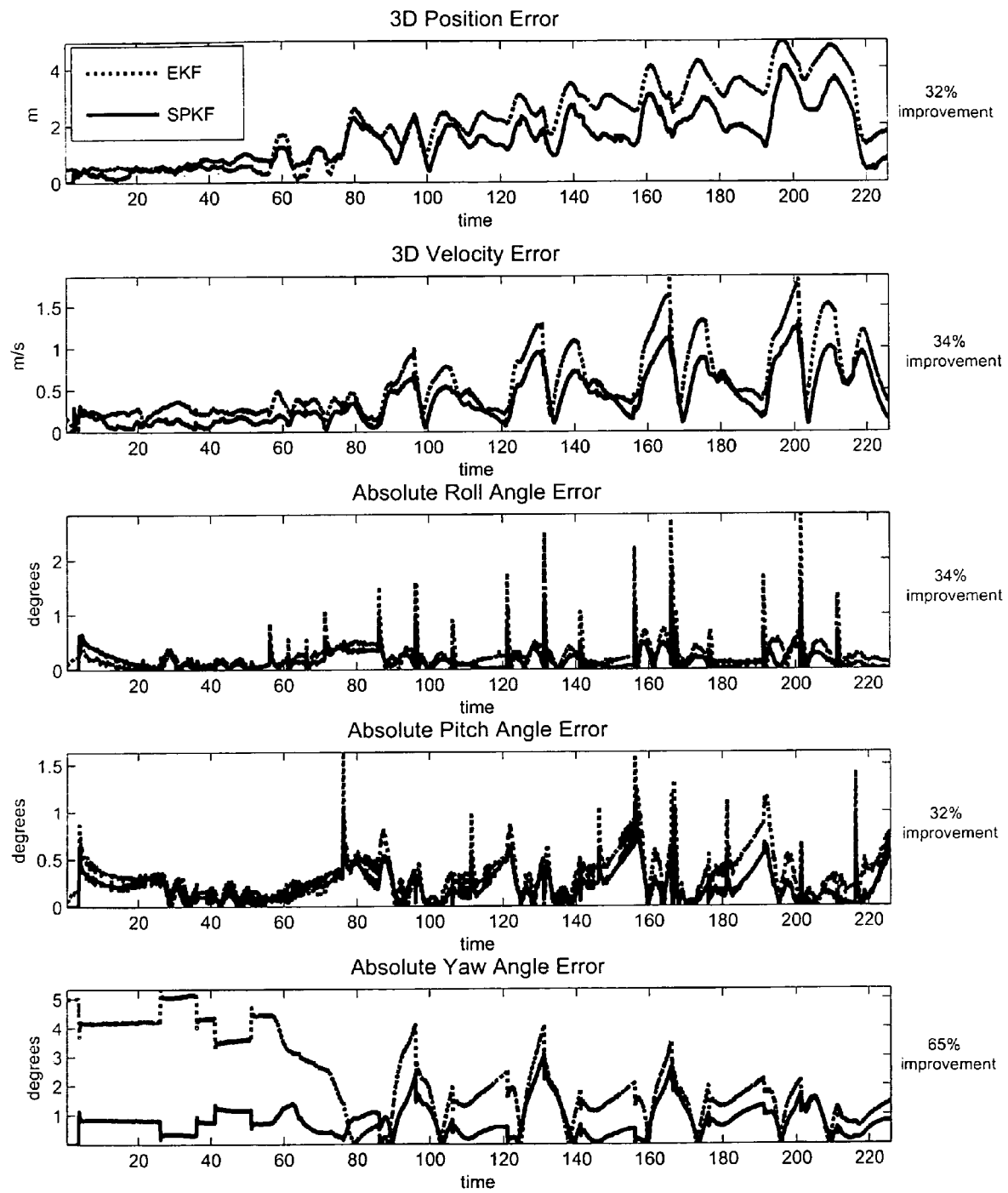
FIG. 6 is a set of graphical plots showing the error performance of the helicopter flown in simulation along the trajectory of FIG. 5.

The table above summarizes the average root-mean-square (RMS) estimation errors for the three different state estimators (EKF, SPKF, latency compensated SPKF). The relative error reduction percentage for each of the two SPKF estimators compared to the EKF is shown in parentheses. The results show that, even though the normal SPKF already outperforms the EKF (as expected), correct accounting for GPS latency is well worth the extra effort. The plots of FIG. 6 show in graphical format the same results as those presented in the table (only the latency compensated SPKF is shown relative to the EKF). FIG. 6 shows both the average improvement of the SPKF, as well as reduction in maximum error (as seen in "spikes" for the EKF) where the start of an aggressive maneuver excites more nonlinear vehicle dynamics.

Experiment 2: In this experiment "closing the loop" in the GNC system is accomplished by feeding the estimated states back to the SDRE control system. In other words, the vehicle control commands will now be a function of the estimates generated by either the EKF or SPKF estimator and not of the "true" vehicle states. This mimics (in simulation) the true interdependency between the estimation and control system as would occur in the real flight hardware during a fully autonomous flight. This experiment thus not only indicates the difference in estimation performance between the different filters, but also how that translates into improved or worsened control-performance. The average linear quadratic (LQ) control cost ($J_{LQ}$), which is a function of the difference between the desired and achieved state trajectories, is calculated as a measure of control performance.

Figure 7:
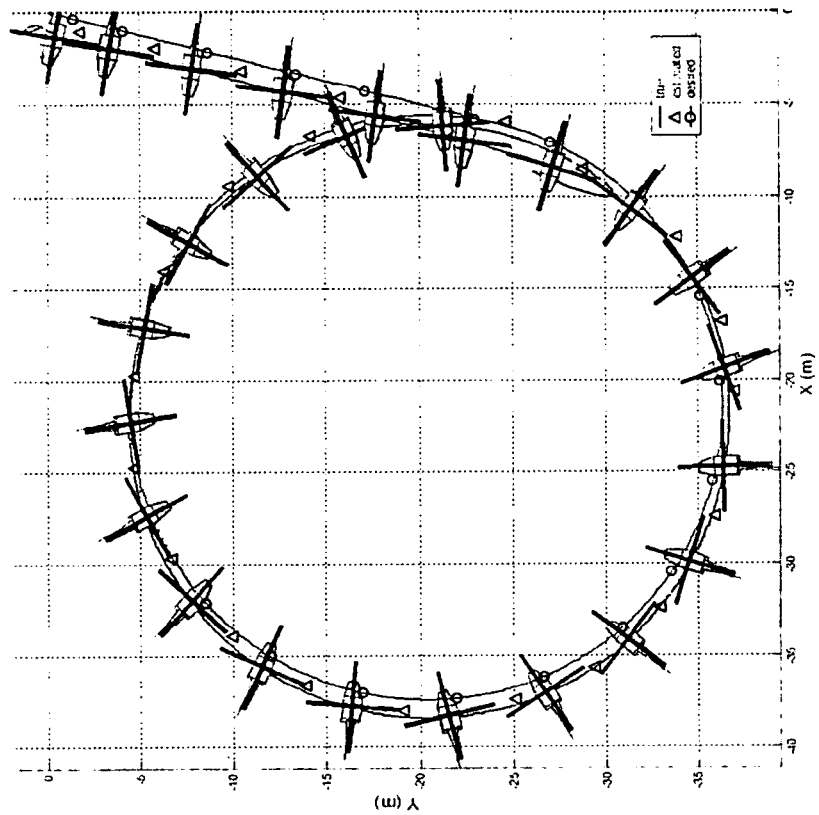
FIG. 7 shows for EKF and SPKF the desired flight trajectory, true realized trajectory, and estimated flight trajectory of a high speed nose-in turn performed by the helicopter flown in simulation.
Figure 7:
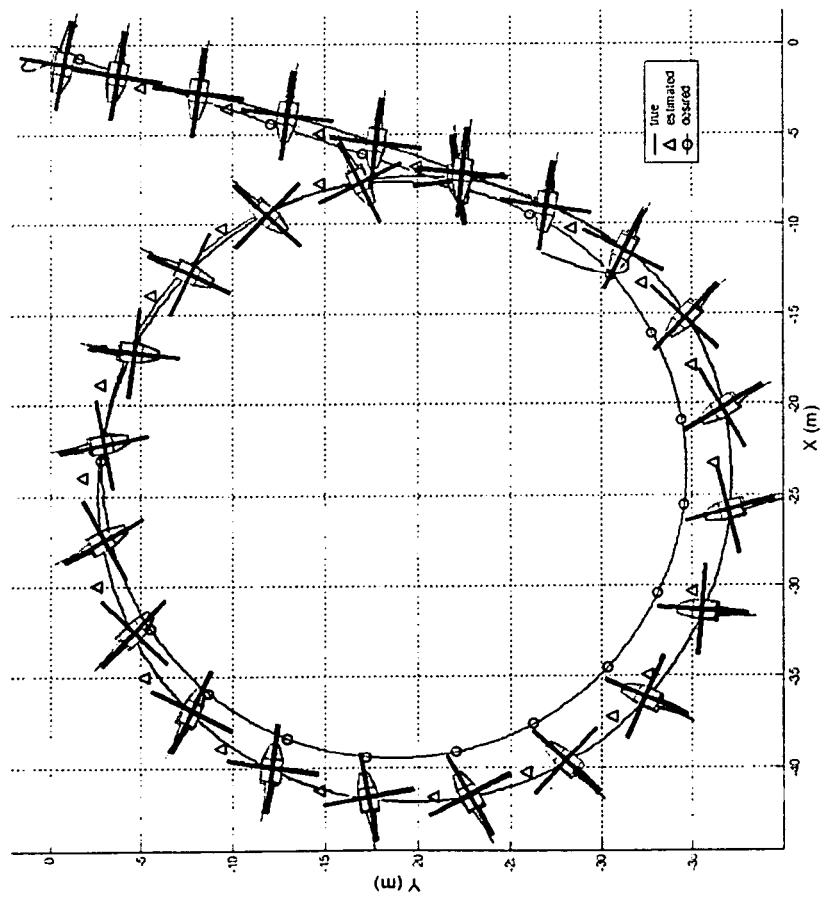

For this experiment, the helicopter was commanded to perform an aggressive high speed nose-in turn. This maneuver requires the helicopter to fly along an imaginary circular trajectory while constantly pointing its nose towards the exact center of the circle. Accurate position, velocity, and especially yaw angle estimates are needed to accurately follow the desired flight plan with the desired attitude. FIG. 7 shows the results of this experiment for both the EKF and SPKF. The desired flight trajectory is indicated by the red curve, the true realized trajectory in blue and the estimated trajectory in green. The true attitude of the helicopter is indicated by periodic renderings of the vehicle itself along the flight path. The left-hand plot shows the results for the EKF, and the right-hand plot shows the results for the SPKF. Clearly for the SPKF case the estimated trajectory is not only close to the true trajectory (small estimation error), but the true trajectory is close to the desired trajectory. This indicates good control performance. The EKF plots clearly shows worse performance according to both these criteria. Also evident from the plots is the much improved yaw angle tracking performance of the SPKF system compared to the EKF system. Not only does the helicopter renderings on the left indicate that their noses are not pointing at the true center of the desired circle, they do not even point to the same point. The SPKF system, on the other hand, does much better in estimating and realizing the correct yaw attitude for this maneuver. Finally, the average control cost of the EKF system for this maneuver was calculated as $J_{LQ}$=3.30, compared to the $J_{LQ}$=1.82 of the SPKF based system. This corresponds to a 45% reduction in control cost. These results again confirm the superior performance of the SPKF over the EKF.

Figure 8:
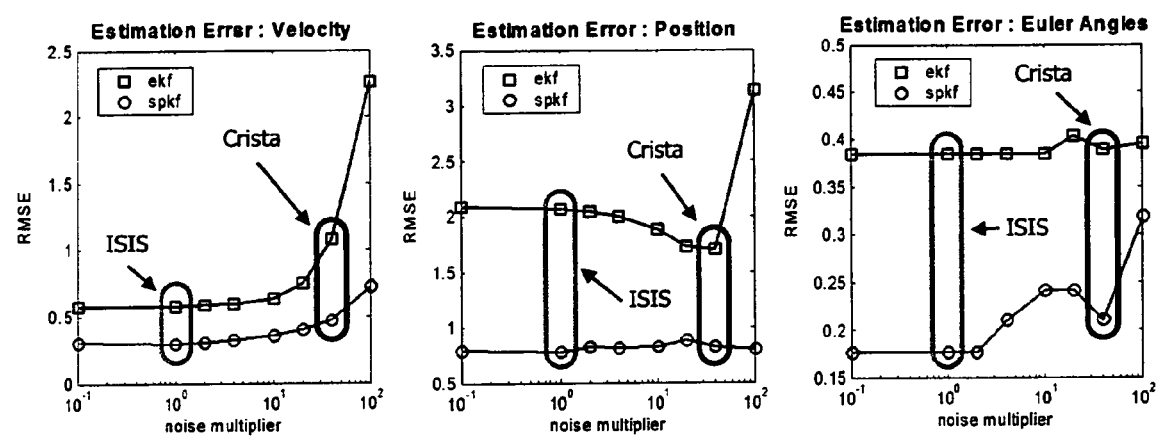
FIG. 8 shows a comparison of RMSE performance versus increase in IMU additive noise.

Experiment 3: In this experiment, preliminary results in simulation compare the robustness of the SPKF to IMU degradation. FIG. 8 shows RMSE performance versus increase in IMU additive noise (standard scaling of additive white Gaussian noise). Highlighted are the nominal performances of an Inertial Sciences ISIS-IMU (cost>10 k, weight=250 g) and the Cloud Cap Crista IMU (cost<2 k, weight=19 g). The Cloud Cap Crista IMU uses MEMs based gyroscopes and accelerometers manufactured by Analog Devises, and have roughly 40 times as much sensor noise as the ISIS-IMU. As indicated by the curves, the performance of the SPKF with the cheaper and less accurate IMU is still superior to the EKF used with the more expensive IMU.

Figure 9:
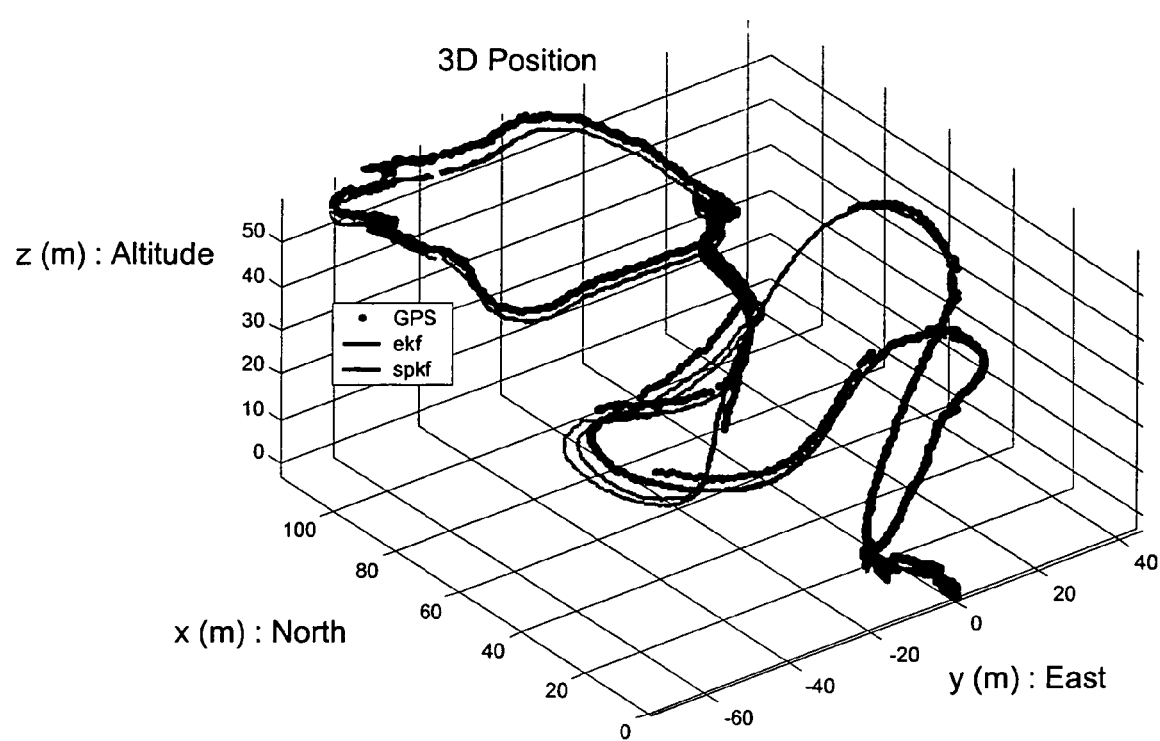
FIG. 9 shows the comparative relationship of the estimated three-dimensional positions for SPKF- and EKF-based systems on actual test flight telemetry.
Figure 10:
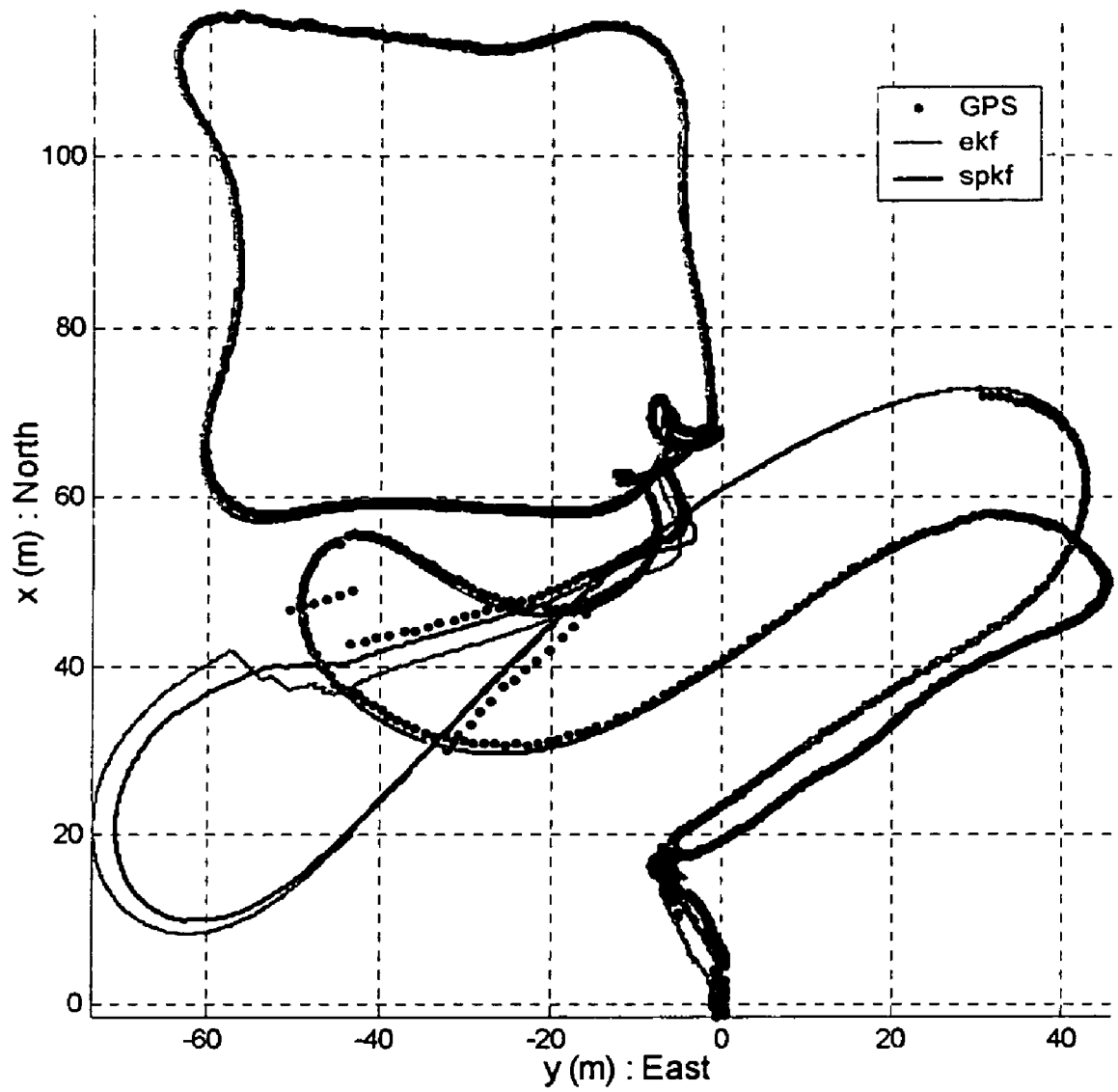
FIG. 10 shows a two-dimensional (top down) projection of the estimation results presented in FIG. 9.
Figure 11A:
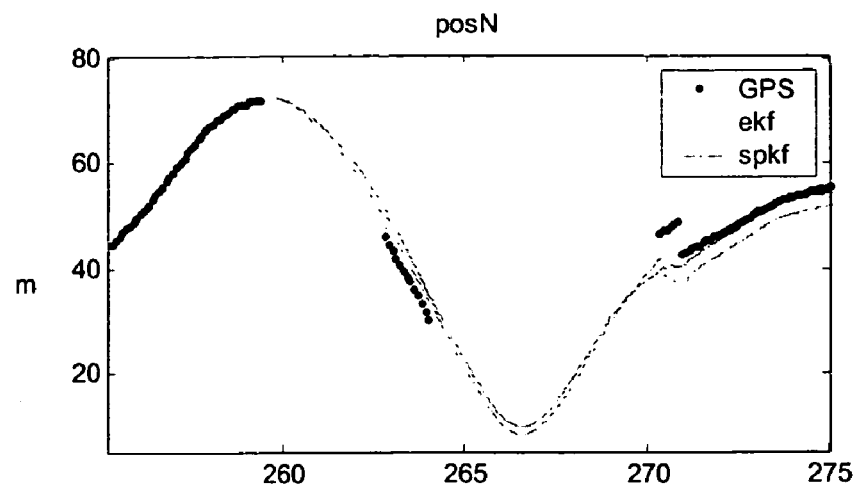
FIGS. 11, 11B, and 11C show the effect of GPS outages on, respectively, the separate north, east, and down components of the estimated three-dimensional positions presented in FIG. 9.
Figure 11B:
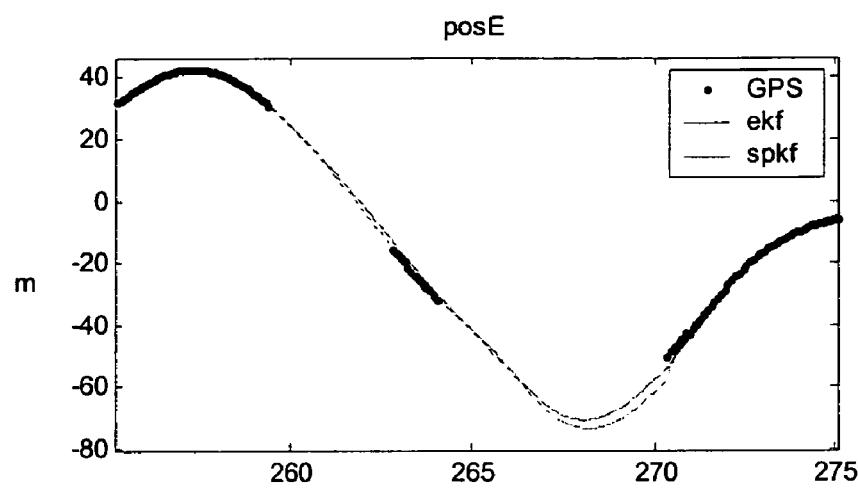
Figure 11C:
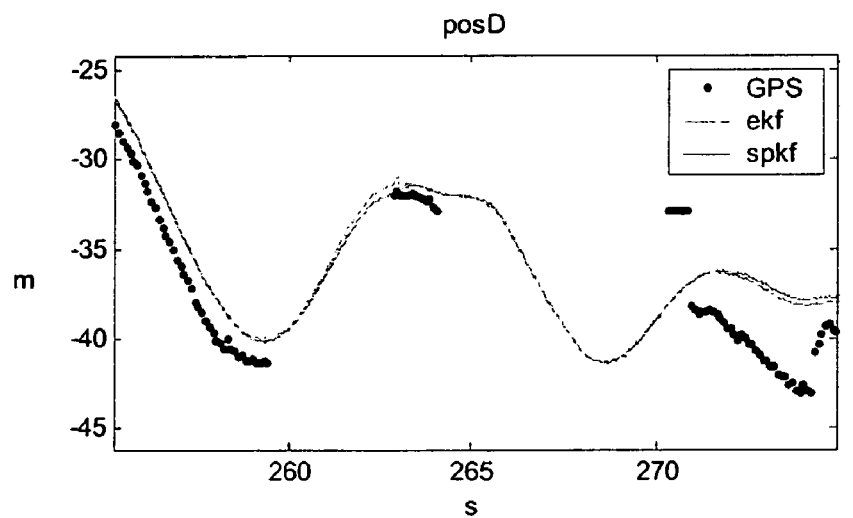

Actual flight data experiments: FIG. 9 shows the estimation results of the SPKF compared to the EKF based system on actual test flight telemetry. The UAV was flown under pilot guidance along a complex sweeping S-shaped maneuver until it reached a specified altitude (50 m), at which point the system was switched to fully autonomous flight. The autonomous flight plan entailed holding the UAV steady in hover for a number of seconds, flying the UAV in a square trajectory at a constant altitude of about 55-60 meters, and again holding the UAV steady in hover for a number of seconds before landing. Because there was no ground truth signal available for absolute error comparison the results are evaluated on more subjective terms. A top-down (2D) projection of the estimation results, which is shown in FIG. 10, provides good insight for this purpose. FIG. 10 shows that a significant number of GPS outages occurred during the pilot guided ascent to the hovering altitude (S-shaped curve). Clearly, the SPKF appears to more accurately track the (assumed) true underlying trajectory during this outage period. Coordinates {40-60} of FIG. 10 indicate that the EKF generated position estimate exhibits an erratic jump just before the GPS measurements again become available. FIGS. 11A, 11B, and 11C show the effect of the GPS outages on, respectively, the separate north, east, and down components of the estimated 3D positions. This error results from the inherent nature of the INS solution (derived from integrating the bias compensated IMU gyroscope and accelerometer data) to drift during periods of GPS outage. Since the SPKF performs a more accurate time-update during these outage periods and possibly more accurately tracks the underlying IMU biases than does the EKF, the resulting SPKF estimates are more robust to GPS outages in general.

Although the above-described preferred embodiment implemented a direct formulation of the kinematics equations, an alternative preferred embodiment of the invention, implements an indirect (error) formulation. In the error formulation, the Kalman filter estimates the errors in the navigation and attitude information. The state variables of the indirect formulation are not position, velocity, and attitude but are the errors in an Inertial Navigation System (INS) computation of position, velocity, and attitude. (The INS uses the direct form of the kinematic equations.) The system observation in the indirect error state formulation is the difference between INS computation and GPS measurements. The error state Kalman filter generates estimates of the errors in the inertial system using external observations that may be updated at a rate much lower than the INS computation rate. This is in contrast to the direct form implementation, which needs to update the filter at the INS rate (e.g., the IMU rate). After each update of the error state Kalman filter with new GPS measurements, the INS is corrected by feedback of the error estimates and the predicted error state is set to zero for the next sample time.

More specifically, analysis of the indirect formulation starts with the standard Kinematic model used within the INS (inertial navigation system), $$\frac{d}{dt} p = v$$

$$\frac{d}{dt} v = C_b^n f_b + g$$

$$\frac{d}{dt} C_b^n = C_b^n (w_{nb}^b \times),$$

where $C_b^n$ is the Direction Cosine Matrix (DCM) from the body frame to the navigation frame, i.e., the local NED frame. The angular rate vector of the body frame with respect to the navigation frame projected to the body frame is given by the skew-symmetric matrix of $W_{nb}^b$, $$(w_{nb}^b \times) = \begin{pmatrix} 0 & -w_z & w_y \\ w_z & 0 & -w_x \\ -w_y & w_x & 0 \end{pmatrix}.$$

The position and velocity measurement equation for the GPS, taking into account the lever-arm effect is $$p_{GPS} = p + C_b^n r_{GPS} + n_{GPS}^p$$

$$v_{GPS} = v + C_b^n w_{nb}^b \times r_{GPS} + n_{GPS}^v, \quad (14)$$

where $r_{GPS}$ is the position of the GPS sensors in the body frame and $n_{GPS}$ is the noise of GPS measurements.

The differences between the INS computations of position, velocity, and quaternion and their true values are $$\delta p = \tilde{p} - p$$

$$\delta v = \tilde{v} - v$$

$$\delta q = \tilde{q}^{-1} \cdot q,$$

where '~' denotes values computed by the INS and '·' denotes quaternion composition. The quaternion can be decomposed as a scalar and a 3×1 vector $$\delta q = \begin{pmatrix} \delta q_0 \\ \overrightarrow{\delta q} \end{pmatrix}.$$

The dynamics for the error states are then given as:
1) Position error $$\frac{d}{dt} \delta p = \delta v \quad (15)$$

2) Attitude error (represented in quaternion)

$$\frac{d}{dt} \overrightarrow{\delta q} \approx -\tilde{w}_{nb}^b \times \overrightarrow{\delta q} - 0.5 \delta w_{nb}^b \quad (16)$$

3) Velocity error $$\frac{d}{dt} \delta v \approx \left(2\tilde{C}_b^n(\tilde{f}_b \times)\right) \overrightarrow{\delta q} + \tilde{C}_b^n \delta f_b \quad (17)$$

Because the navigation range of the vehicle is small, the relative motion between the navigation frame and the inertial frame is neglected in the attitude error expression. Approximations stem from neglecting cross-terms of the error states and the measurement uncertainty. The new error state vector is defined as $$X = \begin{pmatrix} \delta p \\ \delta v \\ \overrightarrow{\delta q} \end{pmatrix}.$$

The position, attitude, and velocity error state Expressions (6-8) provide $$\frac{d}{dt} X = \begin{pmatrix} 0 & I_3 & 0 \\ 0 & 0 & 2\tilde{C}_b^n(\tilde{f}_b) \\ 0 & 0 & -(\tilde{w}_{nb}^b \times) \end{pmatrix} X + \begin{pmatrix} 0 & 0 \\ 0 & \tilde{C}_b^n \\ -0.5 I_3 & 0 \end{pmatrix} \begin{pmatrix} \delta w_{nb}^b \\ \delta f_b \end{pmatrix}. \quad (18)$$

To specify the observation equation, one may write the estimation of the GPS measurements using the INS computation as $$\tilde{p}_{GPS} = \tilde{p} + \tilde{C}_b^n r_{GPS}$$

$$\tilde{v}_{GPS} = \tilde{v} + \tilde{C}_b^n \tilde{w}_{nb}^b \times r_{GPS} \quad (19)$$

Subtracting Equation (14) from Equation (19), and using the definition of the error states, provides $$y = \begin{pmatrix} \tilde{p}_{GPS} \\ \tilde{v}_{GPS} \end{pmatrix} - \begin{pmatrix} p_{GPS} \\ v_{GPS} \end{pmatrix} \quad (20)$$

$$\approx \begin{pmatrix} I_3 & 0 & 2\tilde{C}_b^n(r_{GPS} \times) \\ 0 & I_3 & 2\tilde{C}_b^n((\tilde{w}_{nb}^b \times r_{GPS}) \times) \end{pmatrix} X - \begin{pmatrix} n^p \\ n^v \end{pmatrix}_{GPS}.$$

Equation (18) and Equation (20) describe the error state dynamics and the state observation, respectively. The EKF or SPKF can then be applied to these system equations. Alternative forms of the error state-space may be obtained by either using Euler angles (instead of quaternions) or using the error of the DCM as a state.

The preferred embodiment was described with reference to a loosely coupled GPS/INS integration for UAV autonomy. The invention can also be applied to a tightly coupled integration, in which raw satellite data signal transmissions (e.g., pseudo-range code, carrier phase, and Doppler) are integrated directly with the IMU sensors, thereby effectively bypassing the GPS receiver. The observation data from IMU and raw satellite signal transmissions from the GPS contribute to the probabilistic inference system to enable complete estimation of the navigational state of the system, IMU specific ancillary parameters, and GPS specific ancillary parameters.

The invention can also be applied to only the GPS to integrate raw satellite transmissions in accordance with an SPKF-based approach in contrast to an EKF-based approach. In such an embodiment, the raw satellite signal transmissions are used to estimate a set of navigational state components, including but not limited to, position and velocity information relating to the GPS receiver.

Although the preferred embodiment was described for an SPKF based probabilistic inference system implemented with the square-root version of CDKF (SR-CDKF) algorithm, other sigma-point approach algorithms can be used. A list of examples of such algorithms includes unscented Kalman filter (UKF) algorithms (Algorithm 1), central difference Kalman filter (CDKF) algorithms (Algorithm 2), square-root version of UKF (SR-UKF) (Algorithm 3), square-root version of CDKF (SR-CDKF) (Algorithm 4), sigma-point particle filter (SPPF) algorithm (Algorithm 5), and Gaussian mixture sigma-point particle filter (GMSPPF) algorithm (Algorithm 6). Each parenthetical reference identifies one of the particular algorithms presented below as a collection of the mathematical algorithms listed above.

Algorithm 1: The Unscented Kalman Filter (UKF)

Initialization: $\hat{x}_0 = E[x_0], P_{x_0} = E[(x_0-\hat{x}_0)(x_0-\hat{x}_0)^T]$ $$\hat{x}_0^a = E[x^a] = E[\hat{x}_0 \ 0 \ 0]^T,$$

$$P_0^a = E[(x_0^a - \hat{x}_0^a)(x_0^a - \hat{x}_0^a)^T] = \begin{bmatrix} P_{x_0} & 0 & 0 \\ 0 & R_v & 0 \\ 0 & 0 & R_n \end{bmatrix}$$

For $k=1, \ldots, \infty$:

1. Calculate sigma-points:

$$\chi_{k-1}^a = [\hat{x}_{k-1}^a \ \hat{x}_{k-1}^a + \gamma\sqrt{P_{k-1}^a} \ \hat{x}_{k-1}^a - \gamma\sqrt{P_{k-1}^a}]$$

2. Time-update equations:

$$\mathcal{X}_{k|k-1}^x = f(\mathcal{X}_{k-1}^x, \mathcal{X}_{k-1}^v, u_{k-1})$$

$$\hat{x}_k^- = \sum_{i=0}^{2L} w_i^{(m)} \mathcal{X}_{i,k|k-1}^x$$

$$P_{x_k}^- = \sum_{i=0}^{2L} w_i^{(c)} (\mathcal{X}_{i,k|k-1}^x - \hat{x}_k^-)(\mathcal{X}_{i,k|k-1}^x - \hat{x}_k^-)^T$$

3. Measurement-update equations:

$$\mathcal{Y}_{k|k-1} = h(\mathcal{X}_{k|k-1}^x, \mathcal{X}_{k-1}^n)$$

$$\hat{y}_k^- = \sum_{i=0}^{2L} w_i^{(m)} \mathcal{Y}_{i,k|k-1}$$

$$P_{\hat{y}_k} = \sum_{i=0}^{2L} w_i^{(c)} (\mathcal{Y}_{i,k|k-1} - \hat{y}_k^-)(\mathcal{Y}_{i,k|k-1} - \hat{y}_k^-)^T$$

$$P_{x_k y_k} = \sum_{i=0}^{2L} w_i^{(c)} (\mathcal{X}_{i,k|k-1}^x - \hat{x}_k^-)(\mathcal{Y}_{i,k|k-1} - \hat{y}_k^-)^T$$

$$K_k = P_{x_k y_k} P_{\hat{y}_k}^{-1}$$

$$\hat{x}_k = \hat{x}_k^- + K_k(y_k - \hat{y}_k^-)$$

$$P_{x_k} = P_{x_k}^- - K_k P_{\hat{y}_k} K_k^T$$

Parameters: $x^a = [x^T \ v^T \ n^T]^T$, $\chi^a = [(\chi^x)^T (\chi^v)^T (\chi^n)^T]^T$, $\gamma = \sqrt{L+\gamma}$: $\gamma$ is a composite scaling parameter and $\lambda$ is given in [0007], L is the dimension of the augmented states, $R_v$ is the process-noise covariance, $R_n$ is the observation-noise covariance, and $w_i$ are the weights as calculated in [0007].

Algorithm 2: The Central Difference Kalman Filter (CDKF)—SPKF Formulation

Initialization: $\hat{x}_0 = E[x_0], p_{x_0} = E[(x_0-\hat{x}_0)(x_0-\hat{x}_0)^T]$ For $k=1, \ldots, \infty$:

1. Calculate sigma-points for time-update:

$$\hat{x}_{k-1}^{a_v} = [\hat{x}_{k-1} \ \bar{v}], \quad P_{k-1}^{a_v} = \begin{bmatrix} P_{x_{k-1}} & 0 \\ 0 & R_v \end{bmatrix}$$

$$\mathcal{X}_{k-1}^{a_v} = [\hat{x}_{k-1}^{a_v} \ \hat{x}_{k-1}^{a_v} + h\sqrt{P_{k-1}^{a_v}} \ \hat{x}_{k-1}^{a_v} - h\sqrt{P_{k-1}^{a_v}}]$$

2. Time-update equations:

$$\mathcal{X}_{k|k-1}^x = f(\mathcal{X}_{k-1}^x, \mathcal{X}_{k-1}^v, u_{k-1})$$

$$\hat{x}_k^- = \sum_{i=0}^{2L} w_i^{(m)} \mathcal{X}_{i,k|k-1}^x$$

$$P_{x_k}^- =$$
$$\sum_{i=1}^{L} \left[ w_i^{(c_1)} (\mathcal{X}_{i,k|k-1}^x - \mathcal{X}_{L+i,k|k-1}^x)^2 + w_i^{(c_2)} (\mathcal{X}_{i,k|k-1}^x + \mathcal{X}_{L+i,k|k-1}^x - 2\mathcal{X}_{0,k|k-1}^x)^2 \right]$$

3. Calculate sigma-points for measurement-update:

$$\hat{x}_{k|k-1}^{a_n} = [\hat{x}_k^- \ \bar{n}], \quad P_{k|k-1}^{a_n} = \begin{bmatrix} P_{x_k}^- & 0 \\ 0 & R_n \end{bmatrix}$$

$$\mathcal{X}_{k|k-1}^{a_n} = [\hat{x}_{k|k-1}^{a_n} \ \hat{x}_{k|k-1}^{a_n} + h\sqrt{P_{k|k-1}^{a_n}} \ \hat{x}_{k|k-1}^{a_n} - h\sqrt{P_{k|k-1}^{a_n}}]$$

4. Measurement-update equations:

$$\mathcal{Y}_{k|k-1} = h(\mathcal{X}_{k|k-1}^x, \mathcal{X}_{k|k-1}^n)$$

$$\hat{y}_k^- = \sum_{i=0}^{2L} w_i^{(m)} \mathcal{Y}_{i,k|k-1}$$

$$P_{\hat{y}_k} = \sum_{i=1}^{L} \left[ w_i^{(c_1)} (\mathcal{Y}_{i,k|k-1} - \mathcal{Y}_{L+i,k|k-1})^2 + w_i^{(c_2)} (\mathcal{Y}_{i,k|k-1} + \mathcal{Y}_{L+i,k|k-1} - 2\mathcal{Y}_{0,k|k-1})^2 \right]$$

$$P_{x_k y_k} = \sqrt{w_1^{(c_1)} P_{x_k}^-} \left[ \mathcal{Y}_{1:L,k|k-1} - \mathcal{Y}_{L+1:2L,k|k-1} \right]^T$$

$$K_k = P_{x_k y_k} P_{\hat{y}_k}^{-1}$$

$$\hat{x}_k = \hat{x}_k^- + K_k(y_k - \hat{y}_k^-)$$

$$P_{x_k} = P_{x_k}^- - K_k P_{\hat{y}_k} K_k^T$$

Parameters: $x^{a_v} = [x^T v^T]^T$, $\chi^{a_v} = [(\chi^x)^T (\chi^v)^T]^T$, $x^{a_n} = [x^T \ n^T]^T$, $\chi^{a_n} = [(\chi^x)^T (\chi^n)^T]^T$, $h \geq 1$ is the scalar central difference step size, L is the dimension of the augmented states, $R_v$ is the process-noise covariance, $R_n$ is the observation-noise covariance, and $w_i$ are the weights as calculated in Equation (**). $(\cdot)^2$ is shorthand for the vector outer product, i.e. $a^2 = aa^T$.

General note: Here we again augment the system state with the process noise and observation noise vectors ($v_k$ and $n_k$) as we did for the UKF. For the CDKF, however, we split this augmentation between the time-update and measurement-update, i.e., for the time-update the augmented state vector and augmented covariance matrix is given by $$x_k^{a_v} = [x_k^T \ v_k^T]^T, \quad P_k^{a_v} = \begin{bmatrix} P_{x_k} & 0 \\ 0 & R_v \end{bmatrix},$$

and by $$x_k^{a_n} = [x_k^T \ n_k^T]^T, \quad P_k^{a_n} = \begin{bmatrix} P_{x_k} & 0 \\ 0 & R_n \end{bmatrix},$$

for the measurement-update.

$$\mathcal{X}_0 = \bar{x} \quad (**)$$
$$\mathcal{X}_i = \bar{x} + \left(h\sqrt{P_x}\right)_i \quad i = 1, \ldots, L$$
$$\mathcal{X}_i = \bar{x} - \left(h\sqrt{P_x}\right)_i \quad i = L+1, \ldots, 2L$$
$$w_0^{(m)} = \frac{h^2 - L}{h^2}$$
$$w_i^{(m)} = \frac{1}{2h^2} \quad i = 1, \ldots, 2L$$
$$w_i^{(c_1)} = \frac{1}{4h^2} \quad i = 1, \ldots, 2L$$
$$w_i^{(c_2)} = \frac{h^2 - 1}{4h^4} \quad i = 1, \ldots, 2L$$

Algorithm 3: The Square-Root UKF (SR-UKF)—General State Estimation Form

Initialization: $\hat{x}_0 = E[x_0]$, $S_{x_0} = \text{chol}\{E[(x_0 - \hat{x}_0)(x_0 - \hat{x}_0)^T]\}$, $S_v = \sqrt{R_v}$, $S_n = \sqrt{R_v}$ $$\hat{x}_0^a = E[x^a] = [\hat{x}_0 \ 0 \ 0]^T,$$
$$S_0^a = \text{chol}\{E[(x_0^a - \hat{x}_0^a)(x_0^a - \hat{x}_0^a)^T]\} = \begin{bmatrix} S_{x_0} & 0 & 0 \\ 0 & S_v & 0 \\ 0 & 0 & S_n \end{bmatrix}$$

For k=1, ..., ∞:
1. Calculate sigma-points:

$$\chi_{k-1}^a = [\hat{x}_{k-1}^a \ \hat{x}_{k-1}^a + \gamma S_{x_{k-1}}^a \ \hat{x}_{k-1}^a - \gamma S_{x_{k-1}}^a]$$

2. Time-update equations:

$$\mathcal{X}_{k|k-1}^x = f(\mathcal{X}_{k-1}^a, \mathcal{X}_{k-1}^v, u_{k-1})$$
$$\hat{x}_k^- = \sum_{i=0}^{2L} w_i^{(m)} \mathcal{X}_{i,k|k-1}^x$$
$$S_{x_k}^- = qr\left\{\left[\sqrt{w_1^{(c)}} \left(\mathcal{X}_{1:2L,k|k-1}^x - \hat{x}_k^-\right)\right]\right\}$$
$$S_{x_k}^- = \text{cholupdate}\{S_{x_k}^-, \mathcal{X}_{0,k|k-1}^x - \hat{x}_k^-, w_0^{(c)}\}$$
$$\mathcal{Y}_{k|k-1} = h(\mathcal{X}_{i,k|k-1}^x, \mathcal{X}_{k-1}^n)$$
$$\hat{y}_k^- = \sum_{i=0}^{2L} w_i^{(m)} \mathcal{Y}_{i,k|k-1}$$

3. Measurement-update equations:

$$S_{\tilde{y}_k} = qr\left\{\left[\sqrt{w_1^{(c)}} \left(\mathcal{Y}_{1:2L,k|k-1} - \hat{y}_k^-\right)\right]\right\}$$
$$S_{\tilde{y}_k} = \text{cholupdate}\{S_{\tilde{y}_k}, \mathcal{Y}_{0,k|k-1} - \hat{y}_k^-, w_0^{(c)}\}$$
$$P_{x_k y_k} = \sum_{i=0}^{2L} w_i^{(c)} (\mathcal{X}_{i,k|k-1}^x - \hat{x}_k^-)(\mathcal{Y}_{i,k|k-1} - \hat{y}_k^-)^T$$
$$K_k = \left(P_{x_k y_k} / S_{\tilde{y}_k}^T\right) / S_{\tilde{y}_k}$$
$$\hat{x}_k = \hat{x}_k^- + K_k(y_k - \hat{y}_k^-)$$
$$U = K_k S_{\tilde{y}_k}$$
$$S_{x_k} = \text{cholupdate}\{S_{x_k}^-, U, -1\}$$

Parameters: $x^a = [x^T v^T n^T]^T$, $\chi^a = [(\chi^x)^T (\chi^v)^T (\chi^n)^T]^T$, $\gamma = \sqrt{L+\lambda}$ is the composite scaling parameter and $\lambda$ is given in [0007], L is the dimension of the state, $R_v$ is the process-noise covariance, $R_n$ is the observation-noise covariance, and $w_i$ are the weights as calculated in [0007].

Algorithm 4: The Square-Root CDKF (SR-CDKF)—General State Estimation Form

Initialization: $\hat{x}_0 = E[x_0]$, $S_{x_0} = \text{chol}\{E[(x_0 - \hat{x}_0)(x_0 - \hat{x}_0)^T]\}$, $S_v = \sqrt{R_v}$, $S_n = \sqrt{R_v}$ For k=1, ..., ∞:
1. Calculate sigma points for time-update:

$$\hat{x}_{k-1}^{a_v} = [\hat{x}_{k-1} \ \bar{v}], \quad S_{k-1}^{a_v} = \begin{bmatrix} S_{x_{k-1}} & 0 \\ 0 & S_v \end{bmatrix}$$
$$\mathcal{X}_{k-1}^{a_v} = \begin{bmatrix} \hat{x}_{k-1}^{a_v} & \hat{x}_{k-1}^{a_v} + h S_{k-1}^{a_v} & \hat{x}_{k-1}^{a_v} - h S_{k-1}^{a_v} \end{bmatrix}$$

2. Time-update equations:

$$\mathcal{X}_{k|k-1}^x = f(\mathcal{X}_{k-1}^x, \mathcal{X}_{k-1}^v, u_{k-1})$$
$$\hat{x}_k^- = \sum_{i=0}^{2L} w_i^{(m)} \mathcal{X}_{i,k|k-1}^x$$
$$S_{x_k}^- = qr\left\{\left[\sqrt{w_1^{(c_1)}} \left(\mathcal{X}_{1:L,k|k-1}^x - \mathcal{X}_{L+1:2L,k|k-1}^x\right) \right.\right.$$
$$\left.\left. \sqrt{w_1^{(c_2)}} \left(\mathcal{X}_{1:L,k|k-1}^x + \mathcal{X}_{L+1:2L,k|k-1}^x - 2\mathcal{X}_{0,k|k-1}^x\right)\right]\right\}$$

3. Calculate sigma-points for measurement update:

$$\hat{x}_{k|k-1}^{a_n} = [\hat{x}_k^- \ \bar{n}], \quad S_{k|k-1}^{a_n} = \begin{bmatrix} S_{x_k}^- & 0 \\ 0 & S_n \end{bmatrix}$$
$$\mathcal{X}_{k|k-1}^{a_n} = \begin{bmatrix} \hat{x}_{k|k-1}^{a_n} & \hat{x}_{k|k-1}^{a_n} + h S_{k|k-1}^{a_n} & \hat{x}_{k|k-1}^{a_n} - h S_{k|k-1}^{a_n} \end{bmatrix}$$

4. Measurement-update equations:

$$\mathcal{Y}_{k|k-1} = h(\mathcal{X}_{k|k-1}^x, \mathcal{X}_{k|k-1}^n)$$
$$\hat{y}_k^- = \sum_{i=0}^{2L} w_i^{(m)} \mathcal{Y}_{i,k|k-1}$$
$$S_{\tilde{y}_k} = qr\left\{\left[\sqrt{w_1^{(c_1)}} \left(\mathcal{Y}_{1:L,k|k-1} - \mathcal{Y}_{L+1:2L,k|k-1}\right) \right.\right.$$
$$\left.\left. \sqrt{w_1^{(c_2)}} \left(\mathcal{Y}_{1:L,k|k-1} + \mathcal{Y}_{L+1:2L,k|k-1} - 2\mathcal{Y}_{0,k|k-1}\right)\right]\right\}$$

$$P_{x_k y_k} = \sqrt{w_1^{(c_1)}} S_{x_k}^- [y_{1:L,k|k-1} - y_{L+1:2L,k|k-1}]$$
$$K_k = (P_{x_k y_k} / S_{\tilde{y}_k}^T) / S_{\tilde{y}_k}$$
$$\hat{x}_k = \hat{x}_k^- + K_k(y_k - \hat{y}_k^-)$$
$$U = K_k S_{\tilde{y}_k}$$
$$S_{x_k} = \text{cholupdate}\{S_{x_k}^-, U, -1\}$$

Parameters: $x^{av} = [x^T v^T]^T$, $\chi^{av} = [(\chi^x)^T (\chi^v)^T]^T$, $x^{an} = [x^T n^T]^T$, $\chi^{an} = [(\chi^x)^T (\chi^n)^T]^T$, $h \geq 1$ is the scalar central difference step size, L is the dimension of the augmented states, $R_v$ is the process-noise covariance $R_n$ is the observation-noise covariance, and $w_i$ are the weights as calculated in Equation (**) $(\cdot)^2$ is shorthand for the vector outer product.

$$\mathcal{X}_0 = \bar{x} \qquad (**)$$

$$\mathcal{X}_i = \bar{x} + \left(h\sqrt{P_x}\right)_i \quad i = 1, \ldots, L$$

$$\mathcal{X}_i = \bar{x} - \left(h\sqrt{P_x}\right)_i \quad i = L+1, \ldots, 2L$$

$$w_0^{(m)} = \frac{h^2 - L}{h^2}$$

$$w_i^{(m)} = \frac{1}{2h^2} \quad i = 1, \ldots, 2L$$

$$w_i^{(c_1)} = \frac{1}{4h^2} \quad i = 1, \ldots, 2L$$

$$w_i^{(c_2)} = \frac{h^2 - 1}{4h^4} \quad i = 1, \ldots, 2L$$

Algorithm 5 The Sigma-Point Particle Filter (SPPF)

The new filter that results from using a SPKF for proposal distribution generation within a particle filter framework is called the sigma-point particle filter (SPPF):

Initialization: k=0
1. For i=1, ..., N, draw (sample) particle $x_0^{(i)}$ from the prior $p(x_0)$.

For k=1, 2, ...
1. Importance sampling step
For i=1, ..., N:
(a) Update the Gaussian prior distribution for each particle with the SPKF
Calculate sigma-points for particle, $$x_{k-1}^{a,(i)} = \begin{bmatrix} x_{k-1}^{(i)} & \bar{v}_{k-1} & \bar{n}_{k-1} \end{bmatrix}^T :$$

$$\mathcal{X}_{k-1,(0\ldots 2L)}^{a,(i)} = \begin{bmatrix} x_{k-1}^{a,(i)} & x_{k-1}^{a,(i)} + \gamma\sqrt{P_{k-1}^{a,(i)}} & x_{k-1}^{a,(i)} - \gamma\sqrt{P_{k-1}^{a,(i)}} \end{bmatrix}$$

Propagate sigma-points into future (time update):

$$\mathcal{X}_{k|k-1,(0\ldots 2L)}^{x,(i)} = f(\mathcal{X}_{k-1,(0\ldots 2L)}^{x,(i)}, \mathcal{X}_{k-1,(0\ldots 2L)}^{v,(i)}, u_k)$$

$$\bar{x}_{k|k-1}^{(i)} = \sum_{j=0}^{2L} w_j^{(m)} \mathcal{X}_{k|k-1,j}^{x,(i)}$$

$$P_{k|k-1}^{(i)} = \sum_{j=0}^{2L} w_j^{(c)} (\mathcal{X}_{k|k-1,j}^{x,(i)} - \bar{x}_{k|k-1}^{(i)})(\mathcal{X}_{k|k-1,j}^{x,(i)} - \bar{x}_{k|k-1}^{(i)})^T$$

$$\mathcal{Y}_{k|k-1,(0\ldots 2L)}^{(i)} = h(\mathcal{X}_{k|k-1,(0\ldots 2L)}^{x,(i)}, \mathcal{X}_{k-1,(0\ldots 2L)}^{n,(i)})$$

$$\bar{y}_{k|k-1}^{(i)} = \sum_{j=0}^{2L} w_j^{(m)} \mathcal{Y}_{j,k|k-1}^{(i)}$$

Incorporate new observation (measurement update):

$$P_{y_k y_k} = \sum_{j=0}^{2L} w_j^{(c)} [\mathcal{Y}_{k|k-1,j}^{(i)} - \bar{y}_{k|k-1}^{(i)}][\mathcal{Y}_{k|k-1,j}^{(i)} - \bar{y}_{k|k-1}^{(i)}]^T$$

$$P_{x_k y_k} = \sum_{j=0}^{2L} w_j^{(c)} [\mathcal{X}_{k|k-1,j}^{(i)} - \bar{x}_{k|k-1}^{(i)}][\mathcal{Y}_{k|k-1,j}^{(i)} - \bar{y}_{k|k-1}^{(i)}]^T$$

$$K_k = P_{x_k y_k} P_{y_k y_k}^{-1}$$

$$\bar{x}_k^{(i)} = \bar{x}_{k|k-1}^{(i)} + K_k(y_k - \bar{y}_{k|k-1}^{(i)})$$

$$P_k^{(i)} = P_{k|k-1}^{(i)} - K_k P_{y_k y_k} K_k^T$$

(b) Sample $x_k^{(i)} \sim q_\mathcal{N}(x_k | y_{1:k}) = N(x_k; \bar{x}_k^{(i)}, P_k^{(i)})$
For i=1, ..., N, evaluate the importance weights up to a normalizing constant:

$$w_k^{(i)} = w_{k-1}^{(i)} \frac{p(y_k | x_k^{(i)}) p(x_k^{(i)} | x_{k-1}^{(i)})}{q_\mathcal{N}(x_k^{(i)} | y_{1:k})}$$

For i=1, ..., N, normalize the importance weights:
$\tilde{w}_k^{(i)} = w_k^{(i)} / \sum_{j=1}^{N} w_k^{(i)}$ 2. Selection step (resampling)
Multiply/suppress samples $x_k^{(i)}$ with high/low importance weights $\tilde{w}_k^{(i)}$, respectively, to obtain N random samples approximately distributed according to $p(x_k | y_{1:k})$
For i=1, ..., N, set $w_k^{(i)} = \tilde{w}_k^{(i)} = N^{-1}$.
(optional) Do a single MCMC (Markov chain Monte Carlo) move step to add further 'variety' to the particle set without changing their distribution.

3. Output: The output of the algorithm is a set of samples that can be used to approximate the posterior distribution as follows:

$$\hat{p}(x_k | y_{1:k}) = \frac{1}{N} \sum_{i=1}^{N} \delta(x_k - x_k^{(i)}).$$

From these samples, any estimate of the system state can be calculated, such as the MMSE estimate, $$\hat{x}_k = E[x_k | y_{1:k}] \approx \frac{1}{N} \sum_{i=1}^{N} x_k^{(i)}.$$

Similar expectations of the function $g(x_k)$ (such as MAP estimate, covariance, skewness, etc.) can be calculated as a sample average.

General note: In the resampling stage, not only the particles but also their respective SPKF propagated means and covariances are discarded or duplicated, i.e., we're resampling the whole parallel ensemble of SPKFs. The SPPF presented above makes use of a UKF for proposal generation. Our preferred form however, is a SPPF based around the square-root CDKF (SR-CDKF).

The UKF was used in the pseudo-code above in order to simplify the presentation of the algorithm.

Algorithm 6: The Gaussian Mixture Sigma-Point Particle Filter (GMSPPF)

Figure 12:
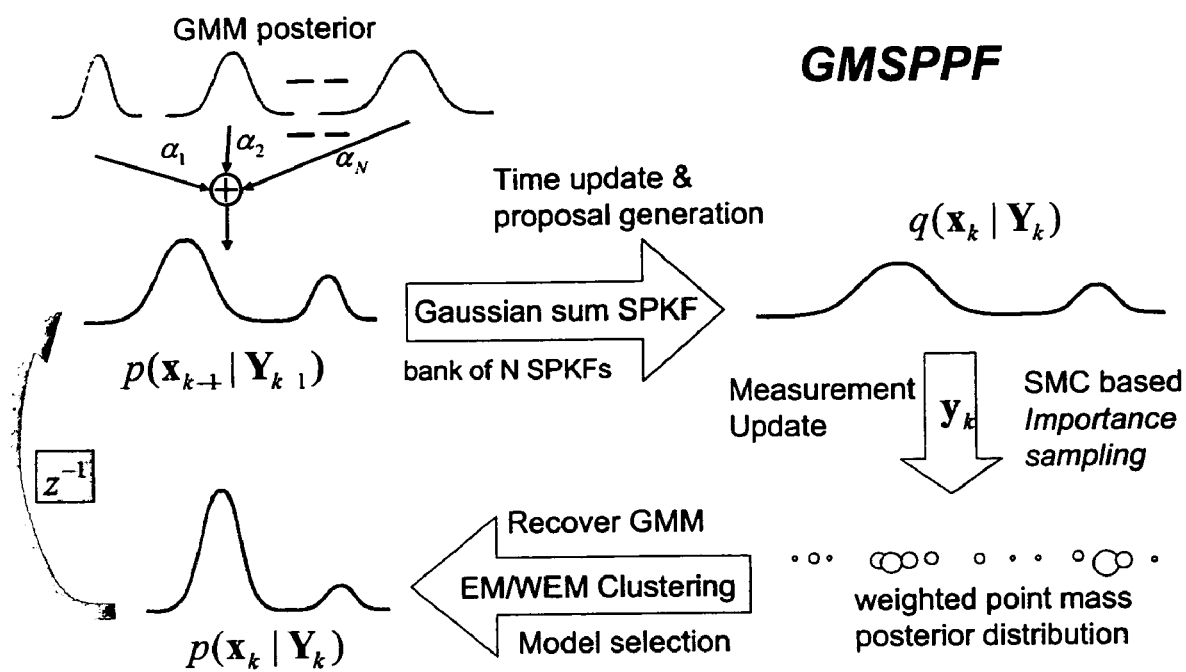
FIG. 12 is a schematic diagram presented as a graphical aid in explanation of the Gaussian Mixture Sigma-Point Particle Filter (GMSPPF) algorithm.

The full GMSPPF algorithm will now be presented based on the component parts discussed above. As a graphical aid to understand this algorithm, please refer to the schematic presented in FIG. 12.

A) Time Update and Proposal Distribution Generation

At time k−1, assume the posterior state density is approximated by the G-component GMM $$\hat{p}_G(x_{k-1} | y_{1:k-1}) = \sum_{g=1}^{G} \hat{\alpha}_{k-1}^{(g)} \mathcal{N}(x_{k-1}; \hat{\mu}_{k-1}^{(g)}, \hat{P}_{k-1}^{(g)}),$$

and the process and observation noise densities are approximated by the following I and J component GMMs respectively $$p_G(v_{k-1}) = \sum_{i=1}^{I} \beta_{k-1}^{(i)} \mathcal{N}(v_{k-1}; \mu_{v,k-1}^{(i)}, Q_{k-1}^{(i)})$$

$$p_G(n_k) = \sum_{j=1}^{J} \gamma_k^{(j)} \mathcal{N}(n_k; \mu_{n,k}^{(j)}, R_k^{(j)})$$

Following the GSF approach of [3], but replacing the EKF with a SPKF, the output of a bank of G"=GIJ parallel SPKFs are used to calculate GMM approximations of $p(x_k|y_{1:k-1})$ and $p(x_k|y_{1:k})$ according to the pseudo-code given below. For clarity of notation define $g' = g + (i-1)G,$ noting that references to g' implies references to the respective g and i, since they are uniquely mapped. Similarly define $g'' = g' + (j-1)GI,$ with the same implied unique index mapping from g" to g' and j. The time-update now proceeds as follows:

1. For $j = 1 \ldots J$, set $\tilde{p}(n_k)^{(j)} = \mathcal{N}(n_k; \mu_{n,k}^{(j)}, R_k^{(j)})$.

For $i = 1 \ldots I$, set $\tilde{p}(v_{k-1})^{(i)} = \mathcal{N}(v_{k-1}; \mu_{v,k-1}^{(i)}, Q_{k-1}^{(i)})$ For $g = 1 \ldots G$, set $\tilde{p}(x_{k-1}|y_{1:k-1})^{(g)} = \mathcal{N}(x_{k-1}; \tilde{\mu}_{k-1}^{(g)}, \tilde{P}_{k-1}^{(g)})$.

2. For g'=1 . . . G' use the time update step of a SPKF (employing the DSSM process equation $x_k = f(x_{k-1}, v_{k-1}, u_{k-1})$ and densities $\tilde{p}(x_{k-1}|y_{1:k-1})^{(g)}$ and $\tilde{p}(v_{k-1})^{(i)}$ from above) to calculate a Gaussian approximate predictive prior density $$\tilde{p}(x_k|y_{1:k-1})^{(g')} = \mathcal{N}(x_k; \mu_{k|k-1}^{(g')}, P_{k|k-1}^{(g')}),$$

and update the mixing weights:

$$\alpha_{k|k-1}^{(g')} = \frac{\alpha_{k-1}^{(g)} \beta_{k-1}^{(i)}}{\sum_{g=1}^{G}\sum_{i=1}^{I} \alpha_{k-1}^{(g)} \beta_{k-1}^{(i)}}.$$

[3] ALSPACH, D. L., AND SORENSON, H. W. Nonlinear Bayesian Estimation using Gaussian Sum Approximation. *IEEE Transactions on Automatic Control* 17, 4 (1972), 439-448.

3. For g"=1 . . . . G", complete the measurement update step of each SPKF (employing the DSSM observation equation $y_k = h(x_k, n_k)$, the current observation $y_k$, and densities $\tilde{p}(x_k|y_{1:k-1})^{(g')}$ and $p(n_k)^{(j)}$ from above) to calculate a Gaussian approximate posterior density $$\tilde{p}(x_k|y_{1:k})^{(g'')} = \mathcal{N}(x_k; \mu_k^{(g'')}, P_k^{(g'')}),$$

and update the GMM mixing weights:

$$\alpha_k^{(g'')} = \frac{\alpha_{k|k-1}^{(g')} \gamma_k^{(j)} z_k^{(j)}}{\sum_{g'=1}^{G'}\sum_{j=1}^{J} \alpha_k^{(g')} \gamma_k^{(j)} z_k^{(j)}},$$

where $z_k^{(j)} = p_j(y_k|x_k)$ is the observation likelihood evaluated at $x_k = \mu_k^{(g')}$ current observation, $y_k$.

The predictive state density is now approximated by the following GMM:

$$p_G(x_k | y_{1:k-1}) = \sum_{g'=1}^{G'} \alpha_{k|k-1}^{(g')} \mathcal{N}(x_k; \mu_{k|k-1}^{(g')}, P_{k|k-1}^{(g')})$$

and the posterior state density (which will only be used as the proposal distribution in the IS-based measurement update step) is approximated by the following GMM:

$$p_G(x_k | y_{1:k}) = \sum_{g''=1}^{G''} \alpha_k^{(g'')} \mathcal{N}(x_k; \mu_k^{(g'')}, P_k^{(g'')}).$$

B) Measurement Update

1. Draw N samples $\{x_k^{(i)}; i=1 \ldots N\}$ from the GMM proposal distribution $p_G(x_k|y_{1:k})$ and calculate their corresponding importance weights:

$$\tilde{w}_k^{(i)} = \frac{p(y_k | x_k^{(i)}) p_G(x_k^{(i)} | y_{1:k-1})}{p_G(x_k^{(i)} | y_{1:k})}.$$

2. Normalize the weights:

$$w_k^{(i)} = \frac{\tilde{w}_k^{(i)}}{\sum_{i=1}^{N} \tilde{w}_k^{(i)}}.$$

3. Use one of the following approaches to fit a G-component GMM to the set of weighted particles $\{w_k^{(i)}, \chi_k^{(i)}; i=1 \ldots N\}$, representing the updated GMM approximate state posterior distribution at time k, i.e.

$$\tilde{p}_G(x_k | y_{1:k}) = \sum_{g=1}^{G} \tilde{\alpha}_k^{(g)} \mathcal{N}(x_k; \tilde{\mu}_k^{(g)}, \tilde{P}_k^{(g)}).$$

(Option A) First resample the set of weighted particles into a new set of N equally weighted particles using any of the efficient resampling techniques[8] known and then apply an expectation-maximization (EM) algorithm to this new cloud of samples approximating the posterior density.

[8]Our preferred method is residual resampling [188, 46].

(Option B) Directly apply a weighted expectation-maximization (WEM) algorithm [132] to the weighted set of particles to recover the GMM posterior.

For both cases, the EM/WEM algorithm is "seeded" by the G means, covariances and mixing weights of the prior state GMM, $p_G(x_{k-1}|y_{1:k-1})$, and iterated until a certain convergence criteria (such as relative dataset likelihood increase) is met. Convergence usually occur within 4-6 iterations. Alternatively, as discussed earlier, an adaptive model-order-selection EM/WEM approach can be used to adaptively determine the optimal number of Gaussian component densities needed in the posterior GMM to accurately model the posterior cloud of samples.

C) Inference

Once the full posterior state density has been calculated in the previous step, any "optimal" estimate of the underlying system state can be calculated. These include estimates such as the condition mean (MMSE), maximum a-posteriori (MAP), mode, median, etc. to name but a few. As an example, we present the MMSE estimate:

[132] McLachlan, G., and Krishnan, T. *The EM Algorithm and Extensions*. Wiley, 1997.

The conditional mean state estimate $$\hat{x}_k = E[x_k|y_{1:k}],$$

and the corresponding error covariance $$\hat{P}_k = E[(x_k - \hat{x}_k)(x_k - \hat{x}_k)^T],$$

can be calculated in one of two ways:

(Option A) The estimates can be calculated before the EM/WEM smoothing stage by a direct weighted sum of the particle set, $$\hat{x} = \sum_{i=1}^{N} w_k^{(i)} x_k^{(i)}$$

$$\hat{P}_k = \sum_{i=1}^{N} w_k^{(i)} (x_k^{(i)} - \hat{x}_k)(x_k^{(i)} - \hat{x}_k)^T,$$

(Option B) or after the posterior GMM has been fitted, $$\hat{x}_k = \sum_{g=1}^{G} \tilde{\alpha}_k^{(g)} \tilde{\mu}_k^{(g)}$$

$$\hat{P}_k = \sum_{g=1}^{G} \tilde{\alpha}_k^{(g)} \left[ P_k^{(g)} + (\tilde{\mu}_k^{(g)} - \hat{x}_k)(\tilde{\mu}_k^{(g)} - \hat{x}_k)^T \right].$$

Since N>>G, the first approach (Option A) is computationally more expensive than the second, but possibly generates better (lower variance) estimates, since it calculates the estimates before the implicit resampling of the WEM step. The choice of which method to use will depend on the specifics of the inference problem and is an ongoing research question.

It will be obvious to those having skill in the art that many changes may be made to the details of the above-described embodiments without departing from the underlying principles of the invention. The following are several examples of such changes.

Although the preferred embodiment estimated a single time-varying IMU gyroscope rate bias vector, the invention can also be applied to estimate IMU scale and alignment parameters. Additional parameters are augmented into the state vector.

Although the preferred embodiment neglected the effects resulting from the rotational rate of the earth as measured in the navigation frame (Coriolis effect), the invention can also be applied to account for these effects by appropriate modification of the kinematics equations.

Although the preferred embodiment used a quaternion representation of the attitude, the invention can also be applied to other attitude representations such as standard Euler angles.

Although the preferred embodiment used a Lagrange approach to maintain unity norm on the quaternion, the constraint may also be accomplished by estimating and updating an error quaternion.

The scope of the present invention should, therefore, be determined only by the following claims.

The invention claimed is:

1. A method performed in an integrated navigation system to estimate the navigational state of an object, the navigational state characterized by random variables of a kinematics-based system state space model, the system state space model specifying a time evolution of the system and its relationship to sensor observations, comprising:

acquiring observation data produced by measurement sensors that provide noisy information about the navigational state, the measurement sensors including an inertial measurement unit (IMU) and a global positioning system (GPS) operating to provide information for estimating a set of navigational state components that include position, velocity, attitude, and angular velocity; and providing a probabilistic inference system to combine the observation data with prediction values of the system state space model to estimate the navigational state, the probabilistic inference system implemented to include a realization of a Gaussian approximate random variable propagation technique performing deterministic sampling without analytic derivative calculations.

2. The method of claim 1, in which the navigational state component set includes bias and scale factor information associated with the IMU.

3. The method of claim 1, in which the navigational state component set includes phase and timing error information associated with the GPS.

4. The method of claim 1, in which the measurement sensors producing observation data constitute sensors of multiple orbital GPS satellites from which raw satellite signal transmissions propagate.

5. The method of claim 1, in which the random variable propagation technique of the probabilistic inference system used to estimate the navigational state includes:

using mean values and square root decomposition of a covariance matrix of a prior random variable to deterministically calculate a set of sigma-points and an associated set of weight values; and propagating the calculated set of weighted sigma-points through the system state space model to produce a posterior set of weighted sigma-points used to calculate posterior statistics.

6. The method of claim 5, in which the calculation of posterior statistics entails the use of closed form functions of the propagated sigma-points and weight values.

7. The method of claim 5, further comprising using the calculated posterior statistics to give an approximately optimal update of the navigational state and its covariance by combining the prediction values of the system state space model and the sensor observations.

8. The method of claim 5, in which the probabilistic inference system used to estimate the navigational state is implemented with one of unscented Kalman filter (UKF)

algorithms, central difference Kalman filter (CDKF) algorithms, square root version of UKF, square root version of CDKF, sigma-point particle filter (SPPF) algorithms, or Gaussian mixture sigma-point particle filter (GMSPPF) algorithms.

9. The method of claim 1, in which the observation data provide noisy information about the navigational state at a time that lags a current time because of sensor latency, communication delay, or other processing delay, and further comprising:

maintaining a cross correlation between a navigational state at a current time and the navigational state to which the latency lagged observation data correspond; and using the cross correlation to optimally combine latency lagged observation data with the prediction values of the system state space model.

10. The method of claim 1, in which the GPS operates to receive raw satellite signal transmissions, and in which the received raw satellite signal transmissions are integrated directly with the IMU, thereby to form a tightly coupled integrated navigation system.

11. The method of claim 1, in which the position and velocity information provided by the GPS is integrated with the IMU, thereby to form a loosely coupled integrated navigation system.

12. An integrated navigation system for estimating the navigational state of an object, the navigational state characterized by random variables of a kinematics-based system state space model, the s stem state space model specifying a time evolution of the system and its relationship to sensor observations, comprising:

measurement sensors producing observation data in the form of noisy information about the navigational state, the measurement sensors including an integrated measurement unit (IMU) and a global positioning system (GPS) operating to provide information for estimating a set of navigational state components that include position, velocity, attitude, and angular velocity; and a probabilistic inference system configured to combine the observation data with prediction values of the system state space model to estimate the navigational state, the probabilistic inference system implemented to include a realization of a Gaussian approximate random variable propagation technique performing deterministic sampling without analytic derivative calculations.

13. The system of claim 12, in which the observation data provide noisy information about the navigational state at a time that lags a current time because of sensor latency, communication delay, or other processing delay, and further comprising:

a computational subsystem operable to maintain a cross correlation between a navigational state at a current time and the navigational state to which the latency lagged observation data correspond; and a computational subsystem operable to use the cross correlation to optimally combine latency lagged observation data with the prediction values of the system state space model.

14. The system of claim 12, in which the navigational state component set includes bias and scale factor information associated with the IMU.

15. The system of claim 12, in which the navigational state component set includes phase and timing error information associated with the GPS.

16. The system of claim 12, in which the measurement sensors producing observation data constitute sensors of multiple orbital GPS satellites from which raw satellite signal transmissions propagate.

17. The system of claim 12, in which the random variable propagation technique of the probabilistic inference system used to estimate the navigational state includes:

use of mean values and square root decomposition of a covariance matrix of a prior random variable to deterministically calculate a set of sigma-points and an associated set of weight values; and propagation of the calculated set of weighted sigma-points through the system state space model to produce a posterior set of weighted sigma-points used to calculate posterior statistics.

18. The system of claim 17, in which the calculation of posterior statistics entails the use of closed form functions of the propagated sigma-points and weight values.

19. The system of claim 17, in which the random variable propagation technique further comprises use of the calculated posterior statistics to give an approximately optimal update of the navigational state and its covariance by combining the prediction values of the system state space model and the sensor observations.

20. The system of claim 17, in which the probabilistic inference system used to estimate the navigational state is implemented with one of unscented Kalman filter (UKF) algorithms, central difference Kalman filter (CDKF) algorithms, square root version of UKF, square root version of CDKF, sigma-point particle filter (SPPF) algorithms, or Gaussian mixture sigma-point particle filter (GMSPPF) algorithms.

21. The system of claim 12, in which the GPS operates to receive raw satellite signal transmissions, and in which the received raw satellite signal transmissions are integrated directly with the IMU, thereby to form a tightly coupled integrated navigation system.

22. The system of claim 12, in which the position and velocity information provided by the GPS is integrated with the IMU, thereby to form a loosely coupled integrated navigation system.

23. A method performed in a global positioning system (GPS) to estimate the navigational state of an object, the navigational state characterized by random variables of a kinematics-based system state space model, the system state space model specifying a time evolution of the system and its relationship to sensor observations, comprising:

acquiring observation data produced by measurement sensors that provide noisy information about the navigational state, the measurement sensors including a GPS operating to receive raw satellite signal transmissions and provide information for estimating a set of navigational state components including position and velocity; and providing a probabilistic inference system to combine the observation data with prediction values of the system state space model to estimate the navigational state, the probabilistic inference system implemented to include a realization of a Gaussian approximate random variable propagation technique performing deterministic sampling without analytic derivative calculations.

24. The method of claim 23, in which the navigational state component set includes phase and timing error information associated with the GPS.

25. The method of claim 23, in which the measurement sensors producing observation data constitute sensors of multiple orbital GPS satellites from which raw satellite signal transmissions propagate.

26. The method of claim 23, in which the random variable propagation technique of the probabilistic inference system used to estimate the navigational state includes:

using mean values and square root decomposition of a covariance matrix of a prior random variable to deterministically calculate a set of sigma-points and an associated set of weight values; and propagating the calculated set of weighted sigma-points through the system state space model to produce a posterior set of weighted sigma-points used to calculate posterior statistics.

27. The method of claim 26, in which the calculation of posterior statistics entails the use of closed form functions of the propagated sigma-points and weight values.

28. The method of claim 26, further comprising using the calculated posterior statistics to give an approximately optimal update of the navigational state and its covariance by combining the prediction values of the system state space model and the sensor observations.

29. The method of claim 26, in which the probabilistic inference system used to estimate the navigational state is implemented with one of unscented Kalman filter (UKF) algorithms, central difference Kalman filter (CDKF) algorithms, square root version of UKF, square root version of CDKF, sigma-point particle filter (SPPF) algorithms, or Gaussian mixture sigma-point particle filter (GMSPPF) algorithms.

30. A method of estimating a state of a system, the state characterized by random variables of a system state space model, the system state space model specifying a time evolution of the system and its relationship to sensor observations, comprising:

acquiring observation data produced by measurement sensors that provide noisy information about the state of the system at a time that lags a current time because of sensor latency, communication delay, or other processing delay;

providing a probabilistic inference system to combine the observation data with prediction values of the system state space model to estimate the state of the system, the probabilistic inference system implemented to include a realization of a Gaussian approximate random variable propagation technique performing deterministic sampling without analytic derivative calculations;

maintaining a cross correlation between a state of the system at a current time and the state to which the latency lagged observation data correspond; and using the cross correlation to optimally combine latency lagged observation data with the prediction values of the system state space model.

31. The method of claim 30, in which the state of a system is a navigational state.

* * * * *